US010235055B1

(12) United States Patent
Saad et al.

(10) Patent No.: US 10,235,055 B1
(45) Date of Patent: Mar. 19, 2019

(54) STORAGE PERFORMANCE TESTING TO EVALUATE MOVING DATA AMONG ARRAYS

(71) Applicant: EMC Corporation, Hopkinton, MA (US)

(72) Inventors: Yossef Saad, Ganei Tikva (IL); Assaf Natanzon, Tel Aviv (IL); Michael Trachtman, Arlington, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 377 days.

(21) Appl. No.: 15/086,503

(22) Filed: Mar. 31, 2016

Related U.S. Application Data

(63) Continuation-in-part of application No. 14/980,501, filed on Dec. 28, 2015, now Pat. No. 10,007,626.

(51) Int. Cl.
*G06F 3/06* (2006.01)
(52) U.S. Cl.
CPC ............ *G06F 3/0611* (2013.01); *G06F 3/061* (2013.01); *G06F 3/067* (2013.01); *G06F 3/0631* (2013.01); *G06F 3/0647* (2013.01); *G06F 3/0653* (2013.01); *G06F 3/0683* (2013.01)
(58) Field of Classification Search
CPC ...... G06F 3/061; G06F 3/0611; G06F 3/0631; G06F 3/0647; G06F 3/0653; G06F 3/067; G06F 3/0683
See application file for complete search history.

(56) References Cited

U.S. PATENT DOCUMENTS

| | | | |
|---|---|---|---|
| 7,155,587 B2 | 12/2006 | Eguchi et al. | |
| 7,184,933 B2 | 2/2007 | Prekeges et al. | |
| 7,286,967 B2 | 10/2007 | Simes | |
| 7,292,969 B1 | 11/2007 | Aharoni et al. | |
| 7,328,307 B2 | 2/2008 | Hoogterp | |
| 7,356,452 B1 | 4/2008 | Naamad et al. | |
| 7,640,231 B2 | 12/2009 | Alvarez et al. | |
| 8,046,554 B2 | 10/2011 | Eguchi et al. | |
| 8,122,158 B1 | 2/2012 | Kudva et al. | |
| 8,380,674 B1 * | 2/2013 | Bolen .................. | G06F 3/0617 707/657 |
| 8,583,885 B1 | 11/2013 | Natanzon | |
| 8,868,797 B1 | 10/2014 | Kirac et al. | |

(Continued)

*Primary Examiner* — Eric T Oberly
(74) *Attorney, Agent, or Firm* — BainwoodHuang

(57) ABSTRACT

A technique controls movement of a logical unit of storage (LUN) among computerized storage. The technique involves selecting, by processing circuitry, a set of target storage locations of the computerized storage. The technique further involves performing, by the processing circuitry, performance evaluation operations on each target storage location of the selected set of target storage locations. The performance evaluation operations performed on each target storage location electronically assess a performance outcome of moving a production LUN from a source storage location of the computerized storage to that target storage location. The technique further involves moving, by the processing circuitry, the production LUN from the source storage location to a particular target storage location of the selected set of target storage locations based on a set of electronic performance assessments resulting from the performance evaluation operations performed on each target storage location.

20 Claims, 11 Drawing Sheets

(56) References Cited

U.S. PATENT DOCUMENTS

| | | | |
|---|---|---|---|
| 8,996,837 B1 | 3/2015 | Bono et al. | |
| 9,183,219 B1 | 11/2015 | Muthirisavenugopal et al. | |
| 9,495,269 B1 | 11/2016 | Hart et al. | |
| 2003/0195960 A1* | 10/2003 | Merriam | G06F 11/3419 709/224 |
| 2009/0144393 A1* | 6/2009 | Kudo | G06F 9/5044 709/218 |
| 2013/0086289 A1* | 4/2013 | Gainey, Jr. | G06F 13/24 710/263 |
| 2013/0246623 A1 | 9/2013 | Seth | |
| 2013/0262382 A1 | 10/2013 | Kruglick | |
| 2014/0289458 A1 | 9/2014 | Lassa | |
| 2015/0066470 A1* | 3/2015 | Chopra | G06F 3/0605 703/20 |
| 2015/0372878 A1 | 12/2015 | Ganesan et al. | |

* cited by examiner

STORAGE PERFORMANCE TESTING TO EVALUATE MOVING DATA AMONG ARRAYS

CROSS-REFERENCE TO RELATED APPLICATIONS

This is a Continuation-in-Part of U.S. application Ser. No. 14/980,501, which is entitled "STORAGE PERFORMANCE TESTING TO EVALUATE MOVING DATA AMONG ARRAYS" and which was filed on Dec. 28, 2015, the contents and teachings of which are hereby incorporated by reference in their entirety.

BACKGROUND

A conventional virtualization device in communication with a data storage array is able to present a logical unit of storage (LUN) on that array to a computerized host device. Additionally, the conventional virtualization device is able to transparently migrate the LUN from one array to another.

For example, suppose that a first array indicates that it is capable of providing a first response time, and that a second array indicates that it is capable of providing a second response time which is faster than the first response time. In such a situation, the conventional storage virtualization device can migrate a LUN from the first array to the second array in an attempt to improve response time to the LUN.

SUMMARY

Unfortunately, there are deficiencies to the above described conventional storage virtualization device. Along these lines, it is possible that there is not the expected improvement in response time after the conventional storage virtualization device migrates a logical unit of storage (LUN) from a first array to a second array. Rather, it is quite possible that additional loading that is put on the second array by the migrated LUN in combination with the earlier loading on the second array results in minimal response time improvement if any. Such a situation may result because simply checking existing performance of an array may not be a good indication of how that array will perform after a LUN has been migrated to that array. In some situations, the response time following LUN migration may even be worse due to additional loading from the LUN that was migrated.

In contrast to the above-described conventional approach to migrating a LUN after simply checking existing performance, improved techniques are directed to moving a LUN, a data set, a workload, a file or filesystem, another type of data construct, or the like (hereafter generally referred to as a LUN) from one storage location to another storage location based on a set of performance assessments resulting from performance evaluation operations performed on each of a set of target storage locations (e.g., a LUN on a different data storage array, a LUN on the same data storage array but different pool, etc.). Such techniques may involve adding a test LUN to a target array to mimic a real production LUN on a source array or simulation apparatus, and then assessing performance of that array under additional loading which mirrors that on the real production LUN. Accordingly, such techniques enable an administrator to smartly place LUNs among various target storage locations to achieve particular desired effects (e.g., concurrent testing of individual target storage locations, testing of multi-LUN combinations on a single array, peak load testing and/or simulation during non-peak times of operation, data warmup and caching/tiering for more accurate performance evaluation, overprovisioning avoidance, and so on).

One embodiment is directed to a method of controlling movement of a LUN among computerized storage. The method includes selecting, by processing circuitry, a set of target storage locations of the computerized storage. The method further includes performing, by the processing circuitry, performance evaluation operations on each target storage location of the selected set of target storage locations. The performance evaluation operations performed on each target storage location electronically assess a performance outcome of moving a production LUN from a source storage location of the computerized storage to that target storage location. The method further includes moving, by the processing circuitry, the production LUN from the source storage location to a particular target storage location of the selected set of target storage locations based on a set of electronic performance assessments resulting from the performance evaluation operations performed on each target storage location.

In some arrangements, performing the performance evaluation operations includes providing simulated host input/output (I/O) requests to at least one target storage location of the selected set of target storage locations while actual host I/O requests are processed on the production LUN at the source storage location on behalf of a set of host computers. Along these lines, copies of the actual host I/O requests (or I/O requests that imitate the actual host I/O requests in operation type, size, etc.) can be sent to one or more target storage locations.

In some arrangements, providing the simulated host I/O requests includes outputting, as the simulated I/O requests, read and write commands which mimic actual read and write commands sent from the set of host computers to the production LUN at the source storage location for processing. Such commands may be small computer system interface (SCSI) commands.

In some arrangements, the computerized storage includes multiple data storage arrays. In these arrangements, providing the simulated host I/O requests includes simultaneously sending the simulated host I/O requests to a respective test LUN on each of the multiple data storage arrays while actual host I/O requests are processed on the production LUN at the source storage location on behalf of the set of host computers. In some arrangements, simultaneously sending the simulated host I/O requests to the respective test LUN on each of the multiple data storage arrays includes outputting a first set of simulated host I/O requests to a first test LUN on a first host-accessible data storage array while the first host-accessible data storage array concurrently processes a first set of actual host I/O requests from the set of host computers. Here, simultaneously sending further includes outputting a second set of simulated host I/O requests to a second test LUN on a second host-accessible data storage array while the second host-accessible data storage array concurrently processes a second set of actual host I/O requests from the set of host computers. Accordingly, multiple data storage arrays are tested at the same time.

In some arrangements, the first host-accessible data storage array includes a faster storage tier of faster storage and a slower storage tier of slower storage that provides slower data access speeds than that of the faster storage tier of faster storage. In these arrangements, outputting the first set of simulated host I/O requests to the first test LUN on the first host-accessible data storage array includes (i) processing some host I/O requests of the first set of simulated host I/O requests using the faster storage tier to determine whether placement of the production LUN on the faster storage tier complies with a predefined service level agreement (SLA) and (ii) processing other host I/O requests of the first set of simulated host I/O requests using the slower storage tier to determine whether placement of the production LUN on the slower storage tier complies with the predefined SLA.

In some arrangements, the method further includes outputting another set of simulated host I/O requests to the first host-accessible data storage array while the first host-accessible data storage array concurrently processes the first set of simulated host I/O requests and the first set of actual host I/O requests to assess a performance outcome of simultaneously re-locating (i) the production LUN from the source storage location of the computerized storage and (ii) another LUN from another source storage location to the first host-accessible data storage array. Such operation enables evaluation of relocating multiple LUNs to the same target data storage array.

In some arrangements, the computerized storage includes an existing data storage array. In these arrangements, the method includes, prior to providing the simulated host I/O requests, creating a set of I/O traces based on monitored operation of the existing data storage array. The created set of I/O traces identify a time period of peak operation of the existing data storage array.

In some arrangements, providing the simulated host I/O requests includes concurrently providing a first set of simulated host I/O requests and a second set of simulated host I/O requests to the existing data storage array. In these arrangements, the first set of simulated host I/O requests duplicates a workload on the existing data storage array during the time period of peak operation of the existing data storage array. The second set of simulated host I/O requests mimics the actual host I/O requests that are processed on the production LUN at the source storage location on behalf of the set of host computers.

In some arrangements, providing the simulated host I/O requests includes concurrently providing a first set of simulated host I/O requests and a second set of simulated host I/O requests to simulation circuitry which simulates behavior of the existing data storage array. In these arrangements, the first set of simulated host I/O requests duplicates, on the simulation circuitry, a workload on the existing data storage array during the time period of peak operation of the existing data storage array. The second set of simulated host I/O requests mimics, on the simulation circuitry, the actual host I/O requests that are processed on the production LUN at the source storage location on behalf of the set of host computers.

In some arrangements, the computerized storage includes a production data storage array and a target data storage array. In these arrangements, the production LUN resides on the production data storage array. The method further includes, prior to providing the simulated host I/O requests, generating specialized metadata based on monitored processing of the actual host I/O requests on the production LUN. The specialized metadata identifies environmental characteristics of the production LUN residing on the production data storage array. Performing the performance evaluation operations further includes, prior to providing the simulated host I/O requests and based on the specialized metadata, configuring a test LUN on the target data storage array with the same environmental characteristics of the production LUN residing on the production data storage array.

In some arrangements, the target data storage array includes (i) multiple data storage tiers providing different data access speeds, (ii) a cache, and (iii) data storage services. In these arrangements, configuring a test LUN on the target data storage array includes (i) distributing data of the test LUN among the multiple data storage tiers of the target data storage array based on the specialized metadata, (ii) copying at least some data of the test LUN into the cache of the target data storage array based on the specialized metadata, and (iii) invoking the data storage services in accordance with the specialized metadata to improve emulation of the production LUN using the test LUN.

In some arrangements, performing the performance evaluation operations further includes, in response to providing simulated host I/O requests to a test LUN at the particular target storage location, detecting that the particular target storage location provides slower data access speeds than that of the source storage location.

In some arrangements, the source storage location resides on a first data storage array, and the particular target storage location resides on a second data storage array. The second data storage array provides slower access to host data than that of the first data storage array. In these arrangements, moving the production LUN from the source storage location to the particular target storage location includes, in response to detection that the particular target storage location (i) provides slower data access speeds than that of the source storage location and (ii) concurrently complies with a service level agreement that defines data access speed requirements for the production LUN, re-locating the production LUN from the first data storage array to the second data storage array that provides the slower access to host data.

In some arrangements, the source storage location resides on a first data storage tier of a data storage array, and the particular target storage location resides on a second data storage tier of the data storage array. The second data storage tier provides slower access to host data than that of the first data storage tier. In these arrangements, moving the production LUN from the source storage location to the particular target storage location includes, in response to detection that the particular target storage location (i) provides slower data access speeds than that of the source storage location and (ii) concurrently complies with a service level agreement that defines data access speed requirements for the production LUN, re-locating the production LUN from the first data storage tier to the second data storage tier that provides the slower access to host data.

Another embodiment is directed to an electronic apparatus which includes interface circuitry constructed and arranged to interface with computerized storage, memory, and control circuitry coupled to the interface circuitry and the memory. The memory stores instructions which, when carried out by the control circuitry, cause the control circuitry to:

(A) select a set of target storage locations of the computerized storage, (B) perform performance evaluation operations on each target storage location of the selected set of target storage locations through the interface circuitry, the performance evaluation operations performed on each target storage location electronically assessing a performance outcome of moving a production logical unit of storage (LUN) from a source storage location of the computerized storage to that target storage location, and (C) move the production LUN from the source storage location to a particular target storage location of the selected set of target storage locations through the interface circuitry based on a set of electronic performance assessments resulting from the performance evaluation operations performed on each target storage location.

Yet another embodiment is directed to a computer program product having a non-transitory computer readable medium which stores a set of instructions to control movement a logical unit of storage (LUN) among computerized storage. The set of instructions, when carried out by computerized circuitry, causes the computerized circuitry to perform a method of:

(A) selecting a set of target storage locations of the computerized storage;

(B) performing performance evaluation operations on each target storage location of the selected set of target storage locations, the performance evaluation operations performed on each target storage location electronically assessing a performance outcome of moving a production LUN from a source storage location of the computerized storage to that target storage location; and (C) moving the production LUN from the source storage location to a particular target storage location of the selected set of target storage locations based on a set of electronic performance assessments resulting from the performance evaluation operations performed on each target storage location.

It should be understood that, in the cloud context, at least some of electronic circuitry which performs the storage performance testing is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in storage performance testing to evaluate moving data among arrays.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Overview

An improved technique is directed to storage performance testing to evaluate moving a logical unit of storage (LUN) among data storage arrays. Such a technique involves adding a test LUN to a target array to mimic a production LUN on a source array, and then assessing performance of the target array under additional loading which mirrors the loading on the production LUN. Such an assessment can be performed in real-time (e.g., even during peak hours for accurate worst case evaluation) and can be made transparent to a set of host devices so that production work is not interrupted. If the performance assessment indicates that the additional load placed on the target array would prevent an expected improvement in response time, movement of the LUN can be canceled. However, if the performance assessment indicates that the additional load would still allow for the expected improvement in response time, movement of the LUN can be allowed to proceed.

As is discussed in further detail herein, such performance testing is further able to determine whether other LUNs on the target array would be damaged by moving the LUN to the target array (e.g., whether another LUN on the target array would be pushed out of compliance with a service level agreement). If it is determined that moving the LUN to the target array would cause performance of another LUN to become unacceptable, the planned move of the LUN to the target array is canceled.

Additionally, as is discussed in further detail herein, smart selection of the target array among multiple candidate arrays can be performed. In particular, an array that has relatively lower load can be selected as the target array since movement of the LUN to that array is likely to result is effective load balancing of the entire data storage environment 20.

Furthermore, as is discussed in further detail herein, it may be determined that the bottleneck is the virtualization layer (e.g., heavy CPU loading of virtualization equipment disposed between the hosts and the actual arrays) rather than the current array. If the bottleneck is the virtualization layer, LUN movement is not performed.

Figure 1:
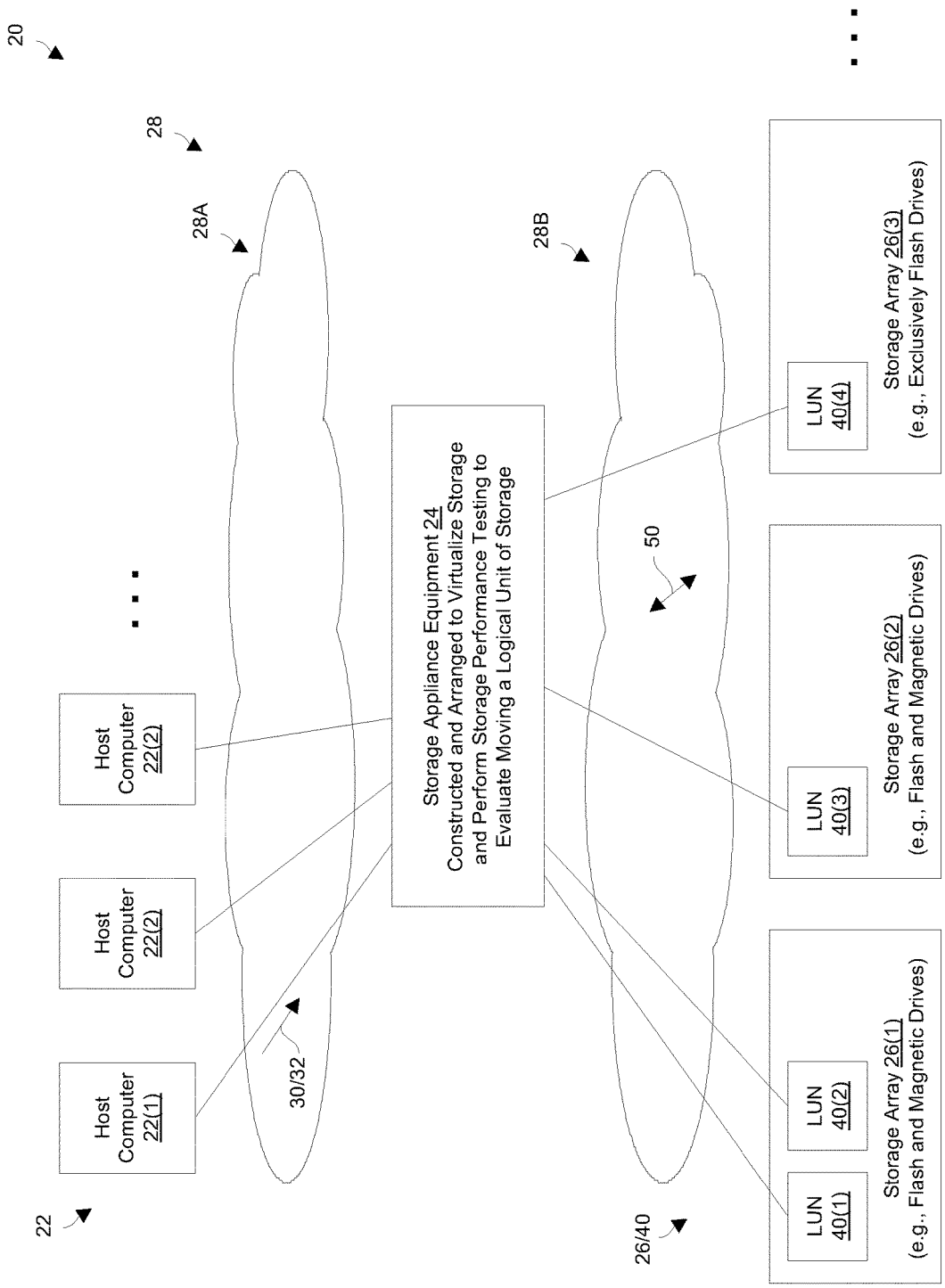
FIG. 1 is a block diagram of a data storage environment which carries out performance testing to evaluate moving a logical unit of storage (LUN) among data storage arrays.

FIG. 1 is a block diagram of a data storage environment 20 which carries out performance testing to evaluate moving a LUN among data storage arrays. The data storage environment 20 includes host computers 22(1), 22(2), 22(3), . . . (collectively, host computers 22), storage appliance equipment 24, data storage arrays 26(1), 26(2), 26(3), . . . (collectively, arrays 26), and communications media 28(A), 28(B) (collectively, communications media 28).

The host computers 22 are constructed and arranged to perform useful work. For example, the host computers 22 may operate as file servers, web servers, email servers, enterprise servers, combinations thereof, and so on, which provide input/output (I/O) requests 30 (e.g., small computer system interface or SCSI commands) to the storage appliance equipment 24 to store data 32 into and read data 32 from the data storage arrays 26.

The storage appliance equipment 24 is constructed and arranged to virtualize storage on the data storage arrays 26. In particular, the storage appliance equipment 24 presents actual LUNs on the arrays 26 as virtual volumes (e.g., virtual disks) to the host computers 22. Accordingly, the host computers 22 are able to communicate with the storage appliance equipment 24 as if the storage appliance equipment 24 was a storage array. In some arrangements, the storage appliance equipment 24 may be formed by multiple individual devices/appliances which are configured as a cluster.

The data storage arrays 26 are actual arrays (e.g., collections of solid state devices, magnetic disk drives, combinations thereof, etc.) that store the data 32. Each data storage array 26 may create and maintain a physical LUN 40 on a local set of storage devices 42, e.g., in a local fast tier of flash memory, in a local medium tier of serial attached SCSI (SAS) drives, and in a local slower tier of near line SAS drives, etc.

By way of example only, the data storage array 26(1) initially includes LUN 40(1) and LUN 40(2). Additionally, the data storage array 26(2) initially includes LUN 40(3). Furthermore, the data storage array 26(3) initially includes LUN 40(4)

The communications medium 28 is constructed and arranged to connect the various components of the data storage environment 20 together to enable these components to exchange electronic signals 50 (e.g., see the double arrow 50) such as storage-based signals, network-based signals, combinations thereof, etc. At least a portion of the communications medium 28 is illustrated as a cloud to indicate that the communications medium 28 is capable of having a variety of different topologies including backbone, hub-and-spoke, loop, irregular, combinations thereof, and so on. Along these lines, the communications medium 28 may include copper-based data communications devices and cabling, fiber optic devices and cabling, wireless devices, combinations thereof, etc. Furthermore, the communications medium 28 is capable of supporting LAN-based communications, SAN-based communications, cellular communications, combinations thereof, etc.

In some arrangements, the communications medium 28A carries IP-based communications while the communications medium 28B carries block-based (e.g., SCSI) communications. In other arrangements, both the communications medium 28A and the communications medium 28B carry TCP/IP-based communications. In yet other arrangements, both the communications medium 28A and the communications medium 28B carry block-based communications. Other combinations and/or configurations are suitable for use as well.

During operation, the host computers 22 send I/O requests 30 to the storage appliance equipment 24 for processing. Such I/O requests 30 may direct the storage appliance equipment 24 to read host data 32 from a particular LUN 40, write host data 32 to a particular LUN 40, and so on. During such operation, the actual location of the host data 32 may be unknown to the host computers 22. Moreover, during such operation, the storage appliance equipment 24 may transparently relocate the host data 32 from one array 26 to another array 26 (e.g., LUN migration) for various reasons such as to maintain certain access times in compliance with a service level agreement (SLA) for that host data 32 (e.g., data access speeds which are less than or equal to 5 milliseconds).

At this point, it should be understood that the storage appliance equipment 24 is capable of carrying out storage performance testing to evaluate moving a LUN 40 among the data storage arrays 26. Such testing involves adding a test LUN 40 to a target array 26 to mimic a production LUN 40 on a source array 26, and then accurately assessing performance of the target array 26 under additional loading which mirrors the loading on the production LUN 40. The storage appliance equipment 24 ensures that performance testing as well as possible eventual movement of the production LUN 40 to the target array will not disrupt any existing LUNs 40 on the target array 26 (e.g., the storage appliance equipment 24 verifies that any existing LUNs 40 will remain compliant with their respective SLAs). If the performance assessment indicates that the additional load placed on the target array 26 would prevent an expected improvement in response time, movement of the production LUN 40 can be canceled. However, if the performance assessment indicates that the additional load would still allow for the expected improvement in response time, movement of the production LUN 40 from the source array 26 to the target array 26 can be allowed to proceed.

Moreover, the storage appliance equipment 24 may determine that the bottleneck is not due to loading on the source array 26. For example, the bottleneck may be due to heavy CPU loading of the storage appliance equipment 24. In response to such detection, the storage appliance equipment 24 does not perform movement of the LUN 40. Further details will now be provided with reference to FIG. 2.

Figure 2:
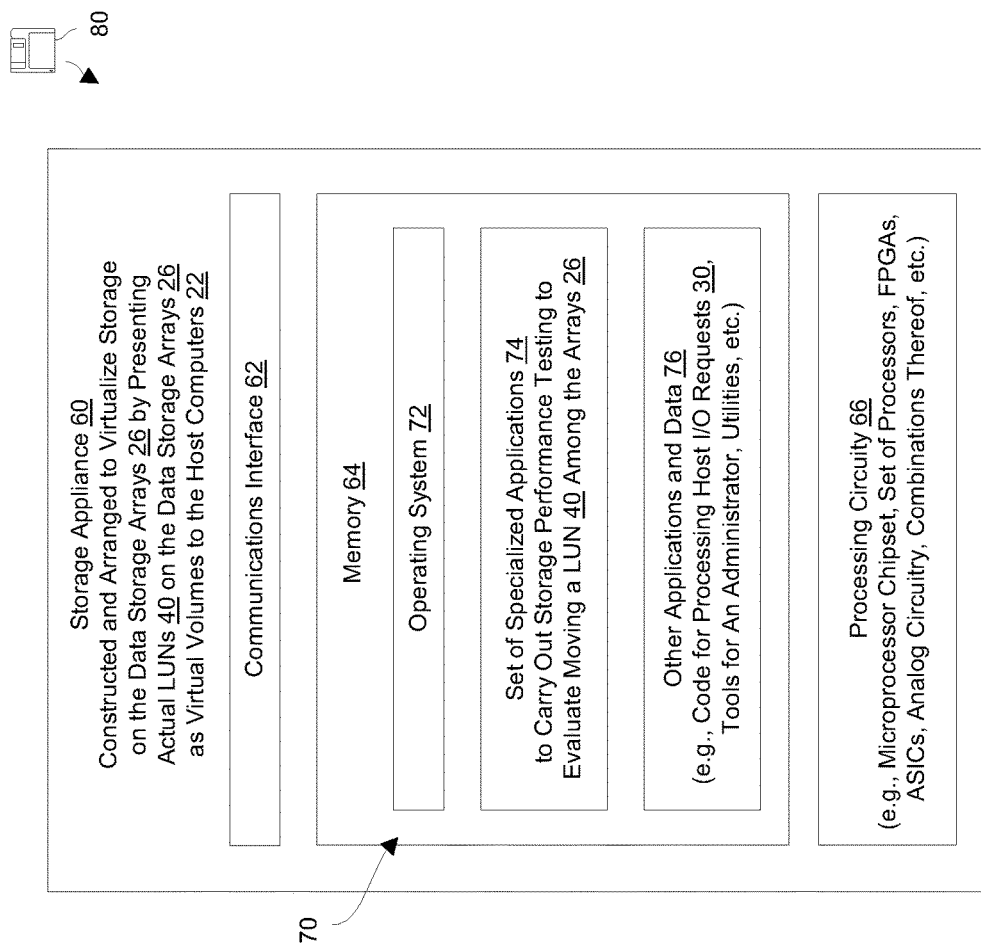
FIG. 2 is a block diagram of a particular apparatus of the data storage environment of FIG. 1.

FIG. 2 shows particular details of a storage appliance 60 which is suitable for use as the storage appliance equipment 24 (FIG. 1) that carries out storage performance testing to evaluate moving a LUN 40 among the arrays 26. In some arrangements, the storage appliance equipment 24 may be formed by multiple storage appliances 60 configured as a cluster. As shown in FIG. 2, the storage appliance 60 includes a communications interface 62, memory 64, and processing circuitry 66.

The communications interface 62 is constructed and arranged to connect the storage appliance 60 to the communications medium 28 (also see FIG. 1) to enable communications with other devices of the data storage environment 20 (e.g., the host computers 22, the data storage arrays 26, etc.). Such communications may be IP-based, SAN-based, cellular-based, cable-based, fiber-optic based, wireless, combinations thereof, and so on. Accordingly, the communications interface 62 enables the storage appliance 60 to robustly and reliably communicate with other external apparatus.

The memory 64 is intended to represent both volatile storage (e.g., DRAM, SRAM, etc.) and non-volatile storage (e.g., flash memory, magnetic memory, etc.). The memory 64 stores a variety of software constructs 70 including an operating system 72 to manage resources of the storage appliance 60 (e.g., processor cycles, memory space, etc.), a set of specialized applications 74 to carry out storage performance testing to evaluate moving a LUN 40 among the arrays 26, and other applications and data 76 (e.g., code for processing host I/O requests 30, code to coordinate operation with other storage appliances 60 in a clustered formation, data storage configuration and management tools, administrative utilities, other data storage and/or user-level applications, and so on). The memory 64 may also operate as a cache for host data 32 that is en route between the host computers 22 and the arrays 26.

The processing circuitry 66 is constructed and arranged to operate in accordance with the various software constructs 70 stored in the memory 64. As will be explained in further detail shortly, the processing circuitry 66 executes the set of specialized applications 74 to form specialized control circuitry that controls movement of LUNs 40 among the arrays 26. Such processing circuitry 66 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 80 is capable of delivering all or portions of the software constructs 70 to the storage appliance 60. In particular, the computer program product 80 has a non-transitory (or non-volatile) computer readable medium which stores a set of instructions which controls one or more operations of the storage appliance 60. Examples of suitable computer readable storage media include tangible articles of manufacture and apparatus which store instructions in a non-volatile manner such as CD-ROM, flash memory, disk memory, tape memory, and the like.

During operation, the storage appliance 60 performs useful work. Along these lines, the storage appliance 60 virtualizes storage on the data storage arrays 26. In particular, the storage appliance 60 presents actual LUNs 40 on the arrays 26 as virtual volumes to the host computers 22. Accordingly, the host computers 22 are able to send host I/O requests 30 to the storage appliance 60 as if the storage appliance 60 was a storage array. In turn, the storage appliance 60 can satisfy the host I/O requests 30 perhaps with participation of one or more of the data storage arrays 26 (e.g., process a host I/O request 30 via a particular data storage array 26, process a host I/O request 30 from a local cache of the storage appliance 60, etc.).

During such operation, the storage appliance 60 may monitor data storage performance of arrays 26. For example, the storage appliance 60 may be part of a cloud storage system which provides storage to multiple tenants (i.e., different customers) in accordance with various SLAs. Along these lines, due to increased loading on the current production array 26 that holds the particular LUN 40, the storage appliance 60 may detect that access times for a particular LUN 40 are gradually approaching a response time requirement that each I/O operation (or that the average I/O operation) must be performed within a certain amount of time such as within 5 milliseconds or less. In response to such detection, the storage appliance 60 may select a target array 26 that is different from the current production array 26, and test that target array 26 to accurately determine whether moving the particular LUN 40 from the current production array 26 to the target array 26 will provide a satisfactory improvement in performance (e.g., an increase in performance by a predefined threshold). If so, the storage appliance 60 transparently moves the particular LUN 40 from the current production array 26 to the target array 26. However, if storage appliance 60 determines that such LUN movement will not provide sufficient improvement in performance or will harm performance of other devices and make their response times non-compliant with policy, the storage appliance 60 does not move the particular LUN 40 from the current production array 26 to the target array 26. Rather, the storage appliance 60 may identify another target array 26 and repeat the above described process. Further details will now be provided with reference to FIGS. 3 and 4.

Figure 3:
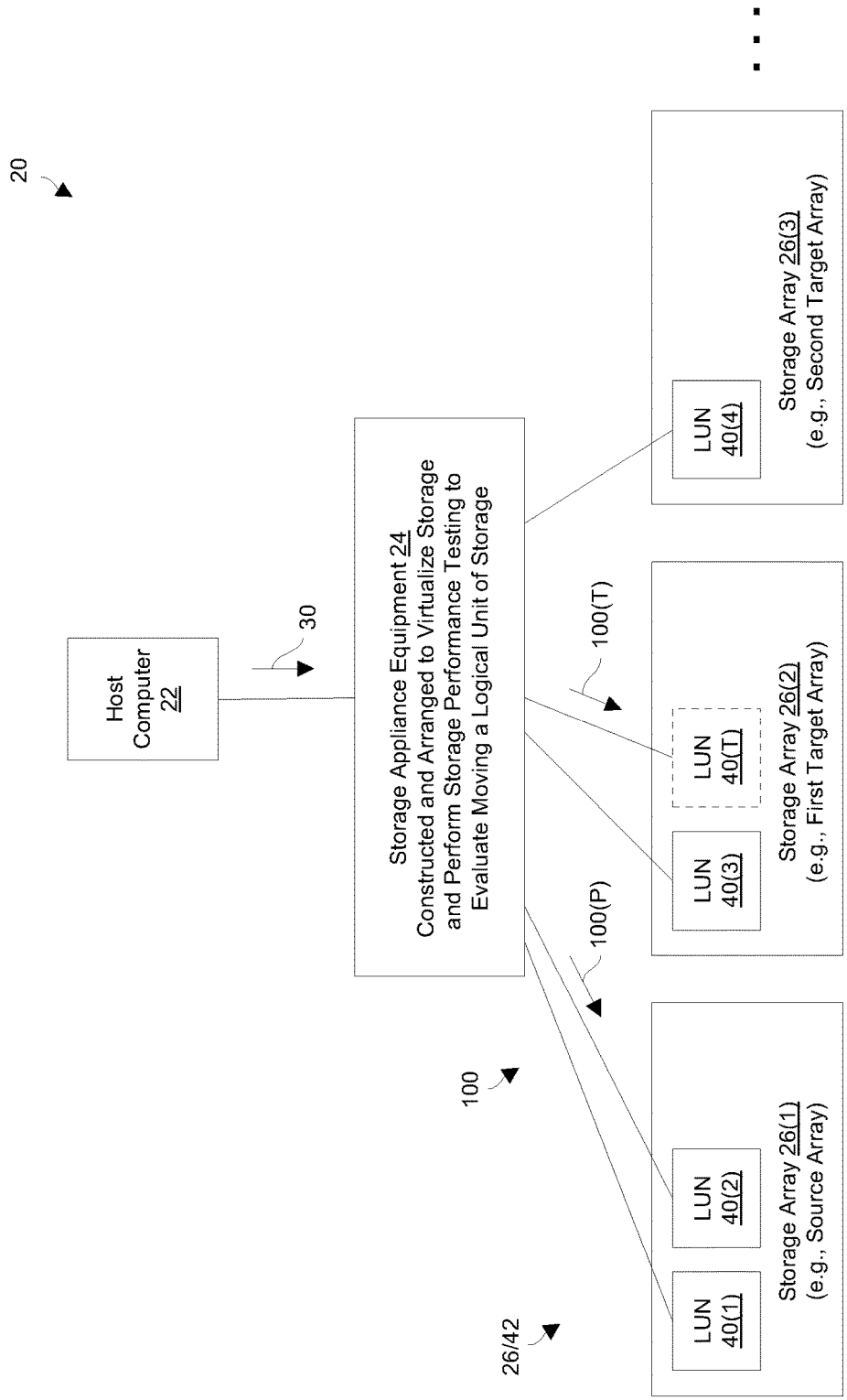
FIG. 3 is a block diagram illustrating particular details of the data storage environment during a storage performance test.
Figure 4:
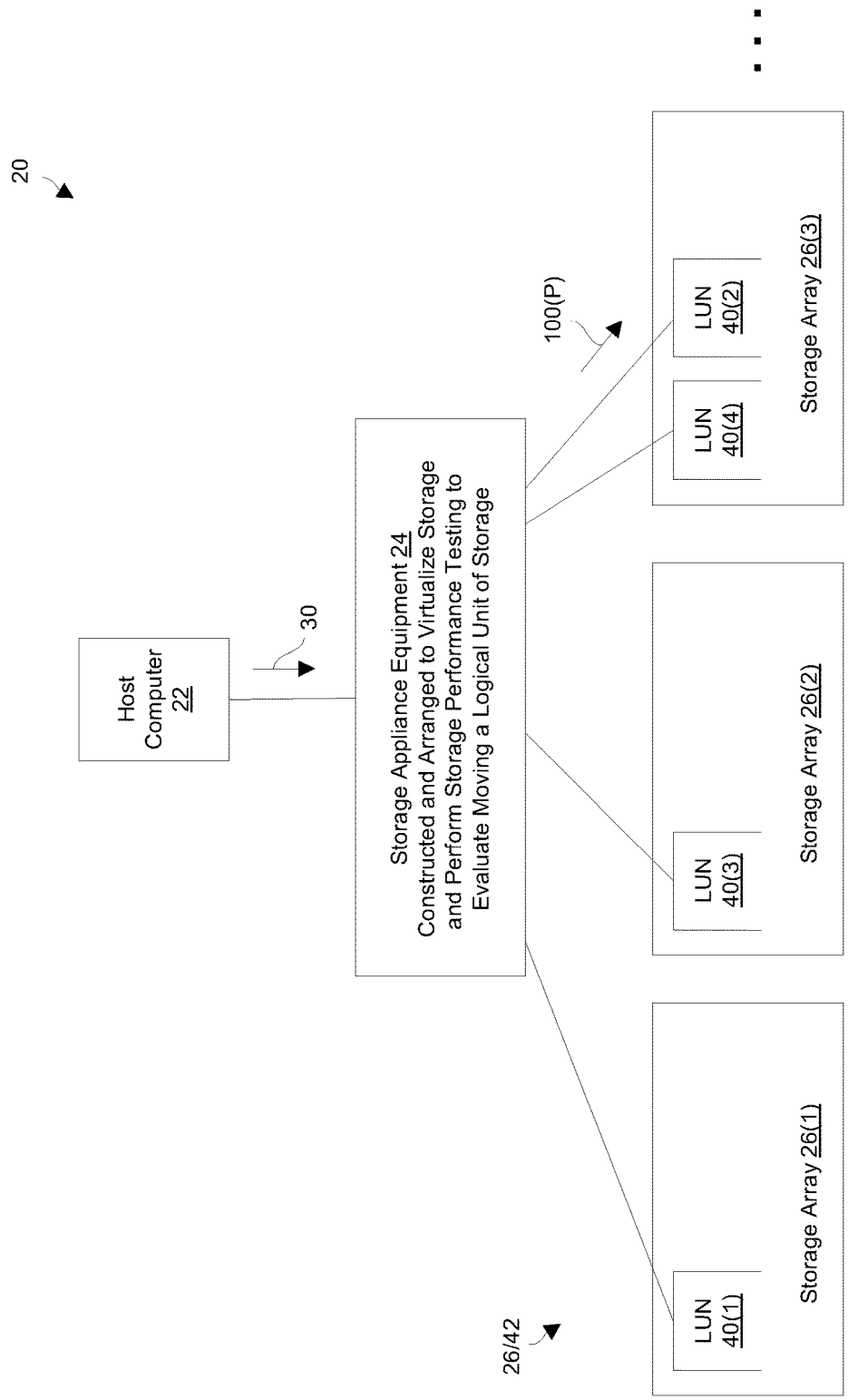
FIG. 4 is a block diagram illustrating particular details of the data storage environment following the storage performance test and once movement of a LUN is completed.

FIGS. 3 and 4 illustrate an example LUN management operation which is performed by the storage appliance equipment 24 of FIG. 1 (also see the storage appliance 60 in FIG. 2). FIG. 3 shows particular details when the storage appliance equipment 24 carries out a storage performance test. FIG. 4 shows particular details when the storage appliance equipment 24 has moved a LUN 40 from one array 26 to another array 26. It should be understood that particular details of the data storage environment 20 (FIG. 1) are omitted from FIGS. 3 and 4 for simplicity.

With attention first directed to FIG. 3, suppose that the host computer 22 accesses a LUN 40(2) on the storage array 26(1) during an initial period of time. During this initial period of time, the host computer 22 sends host I/O requests 30 to the storage appliance equipment 24 which presents the LUN 40(2) to the host computer 22 as a virtual volume. That is, from perspective of the host computer 22, the LUN 40(2) is located at the storage appliance equipment 24 even though the LUN 40(2) is actually located on the array 26(1). Accordingly, the storage appliance equipment 24 may send backend I/O requests 100 (see the arrow 100(P)) to the storage 26(1) to write data into and/or read data from the LUN 40(2) on the array 26(1).

It should be further understood that, during the initial period of time, the storage appliance equipment 24 monitors response times to the LUN 40(2) to ensure that such response times remain in compliance with a particular SLA. For example, the initial average response times may be 4 milliseconds or less, and the particular SLA may require that the average response times be 5 milliseconds or less.

At some point, the average response times may begin to trend higher. For example, over time, the array 26(1) may experience higher loading (i.e., more backend I/O requests 100 to the LUN 40(2) or perhaps to other LUNs 40 located on the array 26(1) such as the LUN 40(1)). Other factors may contribute to the increase in average response time as well such as data displacement from a fast tier of storage devices 42 (e.g., a tier of flash memory) to a slower tier of storage devices 42 (e.g., a tier of magnetic disk drives) on the array 26(1). During this time, the storage appliance equipment 24 continues to monitor response times to the LUN 40(2) on the array 26(1). For example, the average response times may have increased to 4.5 milliseconds.

In this example, suppose that the storage appliance equipment 24 automatically determines that the LUN 40(2) should be moved to another array 26 in order to ensure continued compliance with the SLA. For example, the average response times to the LUN 40(2) may have exceeded a predefined threshold (e.g., 4.7 milliseconds, 4.8 milliseconds, etc.). Alternatively, the storage appliance equipment 24 may perform an estimation based on the rate of increase in response times and determine that load growth will cause non-compliance in 5 days so that the LUN 40(2) must be moved to faster array 26(1) before that time. Other trigger mechanisms are suitable for use as well.

Once the storage appliance equipment 24 determines that the LUN 40(2) should be moved to a new array 26, the LUN 40(2) starts a LUN movement process to relocate the LUN 40(2) to another storage array 26 that more easily supports the particular SLA (e.g., to reduce the response times for the LUN 40(2) to below a predefined threshold such as 4 milliseconds or less). In some arrangements, the storage appliance equipment 24 provides an alert to a human administrator prompting the administrator to approve the LUN movement process. In other arrangements, the storage appliance equipment 24 simply carries out the LUN movement process automatically.

At the beginning of the LUN movement process, the storage appliance equipment 24 identifies a target array 26 to receive the LUN 40(2). Along these lines, the storage appliance equipment 24 may select an array that currently has relatively low loading since movement of the LUN 40 to that array is likely to result is effective load balancing. Such smart candidate selection may be based on available storage space on the other arrays 26, designated response times for the other arrays 26, other capacity criteria, prioritization that is specified by the human administrator, combinations thereof, and so on. In some situation, the location on the target array may be a pool of slices that is already shared with another LUN 40 owned by another tenant (e.g., potential co-tenancy).

In this example, suppose that the storage appliance equipment 24 chooses the storage array 26(2) as the target array 26. As shown in FIG. 3, the storage array 26(2) further holds a LUN 40(3) which may be accessed by the host computer 22 or other host computers 22 which are not shown in FIG. 3 (also see FIG. 1).

At this point, one should appreciate that superficially it may appear that moving the LUN 40(2) from the array 26(1) to the array 26(2) will provide the expected improvement in performance (e.g., a reduction in average response time to 4 milliseconds or less). To obtain more certainty, the storage appliance equipment 24 creates a test LUN 40(T) on the array 26(2).

In some arrangements, the storage appliance equipment 24 copies at least some of the data from the LUN 40(2) to the test LUN 40(T). Here, the copy operations can be throttled/controlled so that there is no significant reduction in response times to the arrays 26(1) and 26(2). Accordingly, compliance with the SLA is maintained. In these arrangements, read operations may be more realistic (i.e., read operations result in reading actual data). Also, in these arrangements, copying data from the LUN 40(2) to the test LUN 40(T) may alleviate the need to copy that data again if the decision is eventually made to move the LUN 40(2) to the array 26(2).

After the test LUN 40(T) has been created, the storage appliance equipment 24 generates multiple backend I/O requests 100 in response to each host I/O request 30 received from the host computer 22. In particular, the storage appliance equipment 24 continues to send backend I/O requests 100(P) to the array 26(1) for processing on the LUN 40(2) which is the production LUN. Additionally, the storage appliance equipment 24 sends backend I/O requests 100(T) to the array 26(2) for processing on the test LUN 40(T).

It should be understood that such I/O request mirroring is transparent to the host computer 22. That is, the host computer 22 continues to send host I/O requests 30 to the storage appliance equipment 24, and the storage appliance equipment 24 sends backend I/O requests 100(P) for processing on the LUN 40(2) of the array 26(1). Furthermore, the results of such processing are provided to the host computer 22. Accordingly, the host computer continues to encounter response times associated with the LUN 26(2) of the array 26(1) (e.g., response times around 4.5 milliseconds).

However, transparent to the host computer 22, the storage appliance equipment 24 concurrently sends backend I/O requests 100(T) for processing on the LUN 40(T) of the array 26(2). Also, the storage appliance equipment 24 blocks the results of backend I/O requests 100(T) from reaching the host computer 22. Accordingly, the storage appliance equipment 24 is able to accurately measure actual response times associated with performing the same operations on the LUN 40(T) of the array 26(2). It is quite possible that the actual response times to the LUN 40(T) of the array 26(2) are significantly poorer than desired or expected response times due to the additional loading placed on the array 26(2) by the backend I/O requests 100(T).

It should be kept in mind that the array 26(2) includes another LUN 40(3) (by way of example only) which may contribute to the poorer performance (e.g., increases in I/O traffic to the array 26(2)). Moreover, while testing using the test LUN is performed, the storage appliance equipment 24 is able to refrain from sending backend I/O requests 100(T) to the array 26(2) if sending these backend I/O requests 100(T) to the array 26(2) would otherwise cause non-compliance of a service level agreement regarding the LUN 40(3).

Such performance measuring of the test LUN 40(T) may continue for a predefined period (e.g., an hour, a day, etc.). In some arrangements, the storage appliance equipment 24 tracks the time of day when each array 26 encounters peak I/O traffic and purposefully performs testing and performance measuring during such a peak time period to ascertain performance under worst case conditions. Along these lines, the average response time during a narrow time window of peak usage (e.g., an hour, less than 24 hours, etc.) is measured to accurately identify worst case response times. In some arrangements, such measurements are performed while the data on the test LUN 40(T) is synchronized with the LUN 26(2).

If the results of such performance measuring indicate that the desired or expected response times would be achieved by moving the LUN 40(2) to the array 26(2), the storage appliance equipment 24 moves the LUN 40(2) from the array 26(1) to the array 26(2). For example, the measurements may indicate that the average response times for the test LUN 40(T) on the array 26(2) are 4.1 milliseconds and the storage appliance equipment 24 is looking for an improvement to 4.2 milliseconds or less. As shown in FIG. 3, if the LUN 40(2) is moved to the array 26(2), the LUN 40(2) can share a slice pool with another LUN 40(3) perhaps even owned by a different tenant (i.e., co-tenancy).

Since the host computer 22 does not know the actual location of the LUN 40(2), and simply sends the host I/O requests 30 to the storage appliance equipment 24, the movement of LUNs 40 among the arrays 26 is transparent to the host computer 22. In some arrangements, the storage appliance equipment 24 deletes the test LUN 40(T) and then migrates the LUN 40(2) from the array 26(1) to the array 26(2). In other arrangements, the storage appliance equipment 24 continues to copy data from the LUN 40(2) on the array 26(1) to the test LUN 40(T) on the array 26(2) if necessary (i.e., until the test LUN 40(T) is synchronized with the LUN 40(2)), and then commits to using the test LUN 40(T) as the production LUN in place of the original LUN 40(2).

It should be understood that the storage appliance equipment 24 is able to impose a minimum amount of time before the production LUN can be moved again. As a result, the production LUN will not excessively bounce from one array to another.

However, if the results of such performance measuring indicate that there is not the desired or expected response times to the test LUN 40(T) on the array 26(2), the storage appliance equipment 24 cancels movement of the LUN 40(2) to the array 26(2). Here, the storage appliance equipment 24 has not yet committed to using the array 26(2), and can delete the test LUN 40(T). In this situation, the storage appliance equipment 24 can restart the LUN movement process using a different array 26 (e.g., the array 26(3) in FIG. 3). Alternatively, the storage appliance equipment 24 can automatically move the LUN 40(2) to an array 26 which is specified by default (e.g., an array 26 which is provisioned fully with flash memory as a safeguard to ensuring compliance with the SLA). Other alternatives are suitable for use as well (e.g., sending an alert to the human administrator, attempting migration to a different storage tier or a different RAID group on the same array 26 or a different array 26, combinations thereof, etc.).

FIG. 4 shows the LUN 40(2) moved from the array 26(1) to another array 26(3) after the LUN movement process accurately indicates that movement of the LUN 40(2) to the array 26(2) would not provide the desired/expected improvement in response time. Such operation prevents the storage appliance equipment 24 from providing ineffective performance improvement which would have otherwise been the case if the storage appliance equipment 24 had blindly moved the LUN 40(2) to the array 26(2). Instead, such operation provides the desired/expected improvement in response time with greater certainty. Further details will now be provided with reference to FIG. 5.

Figure 5:
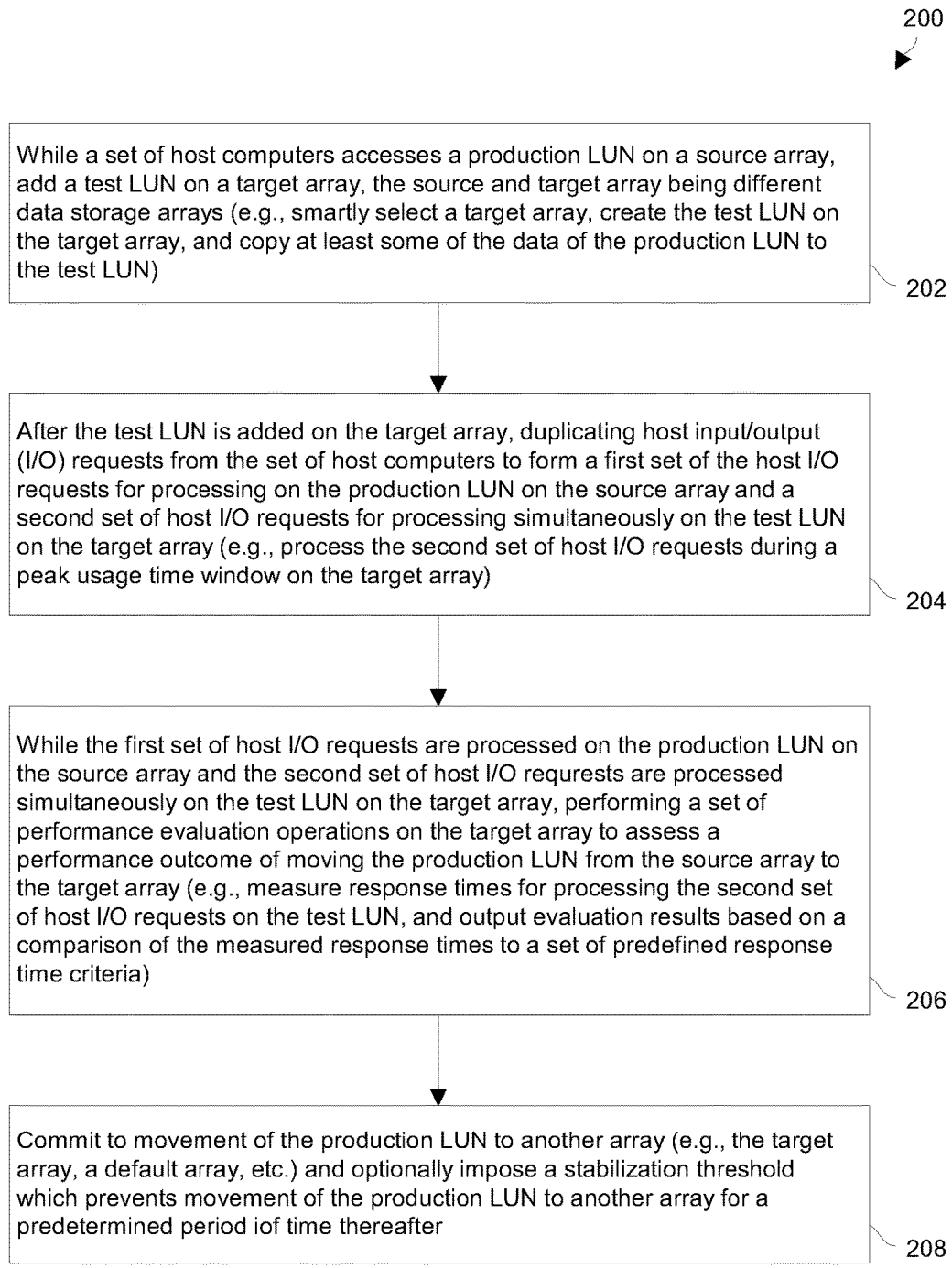
FIG. 5 is a flowchart of a procedure which is performed by the data storage environment of FIG. 1.

FIG. 5 is a flowchart of a procedure 200 which is performed by circuitry of the data storage environment 20 to evaluate moving a LUN 40 among data storage arrays 26. In particular, the procedure involves performing a storage performance test to make such an evaluation.

At 202, the circuitry adds, while a set of host computers accesses a production LUN on a source array, a test LUN on a target array. The source array and the target array are different data storage arrays of the data storage environment 20 (also see FIG. 3). Along these lines, the circuitry may choose, as the target array, an array that has relatively low loading. For example, the circuitry can create the test LUN and copy at least some of the data of the production LUN to the test LUN.

At 204, the circuitry duplicates, after the test LUN is added on the target array, host I/O requests from the set of host computers to form a first set of the host I/O requests for processing on the production LUN on the source array and a second set of the host I/O requests for processing simultaneously on the test LUN on the target array. In particular, the circuitry can process the second set of the host I/O requests on the test LUN on the target array during the identified peak usage time window to measure worst case response times when performing the set of performance evaluation operations on the target array.

At 206, the circuitry performs, while the first set of the host I/O requests are processed on the production LUN on the source array and the second set of the host I/O requests are processed simultaneously on the test LUN on the target array, a set of performance evaluation operations on the target array to assess a performance outcome of moving the production LUN from the source array to the target array. In particular, the circuitry measures response times for processing the second set of the host I/O requests on the test LUN on the target array, and outputs evaluation results based on a comparison of the measured response times to a set of predefined response time criteria. Here, the circuitry additionally verifies that existing LUNs on the target array will not be hampered by movement of the production LUN to the target array (e.g., the existing LUNs will remain compliant with their respective SLAs).

At 208, the circuitry commits to movement of the production LUN to another array (e.g., the target array, a default array, etc.). Here, the circuitry may impose a stabilization threshold which prevents the set of host computers from committing to use another test LUN, as another new production LUN in place of the new production LUN, during a predefined period of time following completion of the LUN migration commitment operation. Such operation prevents the production LUN from moving too frequently (e.g., "bouncing") from one array to another which can waste resources.

As described above, improved techniques are directed to performing a storage performance test to accurately evaluate moving a LUN 40. Such techniques involve adding a test LUN 40(T) to a target array 26 to mimic a real production LUN on a source array 26, and then assessing performance of the target array 26 under additional loading which mirrors that on the real production LUN 40. Such an assessment can be performed in real-time and can be made transparent to a set of host computers 22 so that the production work is not interrupted. If the assessment indicates that the additional load would prevent the expected improvement in response time, migration of the LUN 40 can be canceled. However, if the assessment indicates that the expected improvement in response time would still occur even under the additional load, migration of the LUN 40 can be allowed to proceed.

One should appreciate that data may be constantly moved from one storage location to another, for various reasons, such as technology refresh, tiering and/or migrations. However, without accurate storage performance testing, there is no certainty that an array will operate as expected after the data is moved to it. For example, the array may not be able to carry the additional load. As disclosed herein, real-time performance testing of storage can be done using a storage virtualization layer. In particular, the virtualization layer duplicates I/O operations (e.g., writes/reads/etc.) coming from/to the host to both the existing location (e.g., a production LUN) and a possible new/future location, and over time measures the response time of the new storage location. The measured response times can be analyzed and provide a clear picture of the performance that could be expected from the new storage location, before committing to the new storage location and without interrupting the production work. Such techniques provide performance analysis that accurately reflects storage behavior after the data is moved.

One should further appreciate that the above-described techniques do not merely select LUNs or other objects. Rather, the disclosed techniques involve adding a test LUN 40 to a target array 26 to assess whether to move a production LUN 40 to the target array 26. With such improvements to data storage technology, other advantages are available as well such as effective virtualization of volumes (e.g., effective movement of LUNs to improve response time), and so on.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 such as the host computers 22, etc. are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, it should be understood that a variety of different thresholds are suitable for use by the data storage environment 20. For example, one threshold can define when to perform the LUN movement process, another threshold may apply to response times for write operations, another threshold may apply to response times for read operations, another threshold may apply to average response times, another threshold may apply to the worst case response time, and so on. Furthermore, threshold values which are different than those provided in the examples above are also suitable for use. Moreover, such thresholds, behaviors, requirements, etc. can be defined within a service level agreement (SLA), e.g., a requirements document between a cloud service provider and a tenant.

Furthermore, it should be understood that, in some arrangements, the circuitry of the data storage environment 20 evaluates multiple target arrays simultaneously. In such arrangements, the circuitry applies predefined selection criteria to select the best target array among the candidate target arrays, and positions/moves the LUN to the best target array based on the predefined selection criteria.

Additionally, in some arrangements, the circuitry of the data storage environment 20 is configured to select, as the target array, a lower performing array. In these arrangements, the circuitry transfers the LUN to another array which still satisfies the needs of that LUN (e.g., maintains SLA compliance) thus freeing resources on the source array for other activities (e.g., to support other LUNs). Moreover, one should appreciate that there may be non-performance reasons for moving LUNs among arrays (e.g., tech refresh, legal or accounting reasons, multi-tenancy restrictions, etc.) and the circuitry disclosed herein is suitable for handling such activities.

At this point, one should appreciate that, in contrast to a conventional approach to migrating a LUN after simply checking existing performance of that LUN, the above-described improved techniques enable moving a LUN, a data set, a workload, etc. (hereafter simply a LUN) from one storage location to another storage location based on a set of performance assessments resulting from performance evaluation operations performed on each of a set of target storage locations. Such techniques may involve adding a test LUN to a target array to simulate a real production LUN on a source array or simulating such activity on a dedicated test apparatus, and then assessing performance under additional loading which more accurately mirrors that on the real production LUN. Such techniques enable a user to smartly place one or more LUNs among various target storage locations to achieve various desired effects (e.g., concurrent testing of individual target storage locations, testing of multi-LUN combinations on arrays, peak load testing and/or simulation during non-peak times of operation, data warmup and caching/tiering for more accurate performance evaluation, overprovisioning avoidance, and so on).

Figure 6:
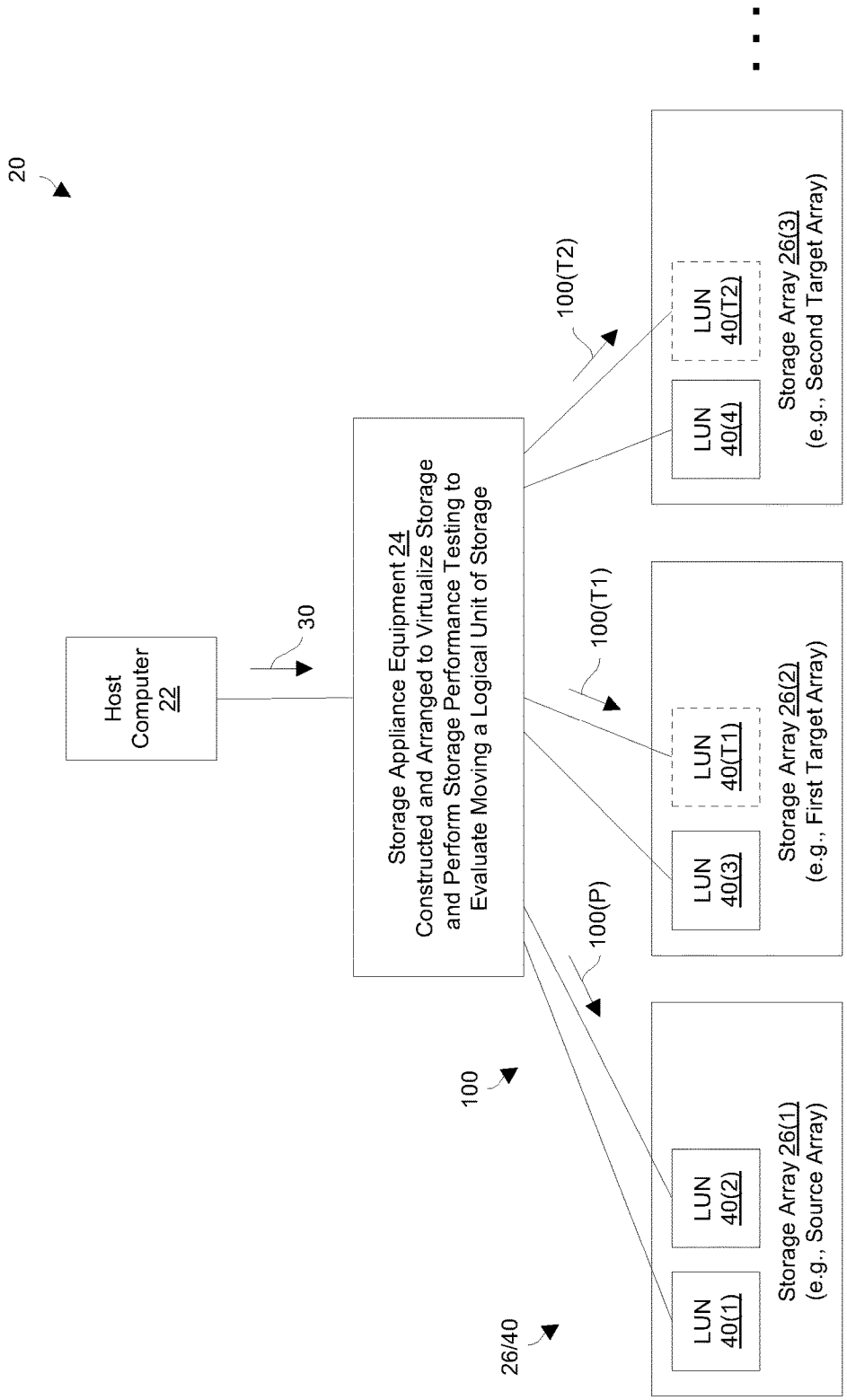
FIG. 6 is a block diagram illustrating particular details of the data storage environment during simultaneous storage performance testing.
Figure 7:
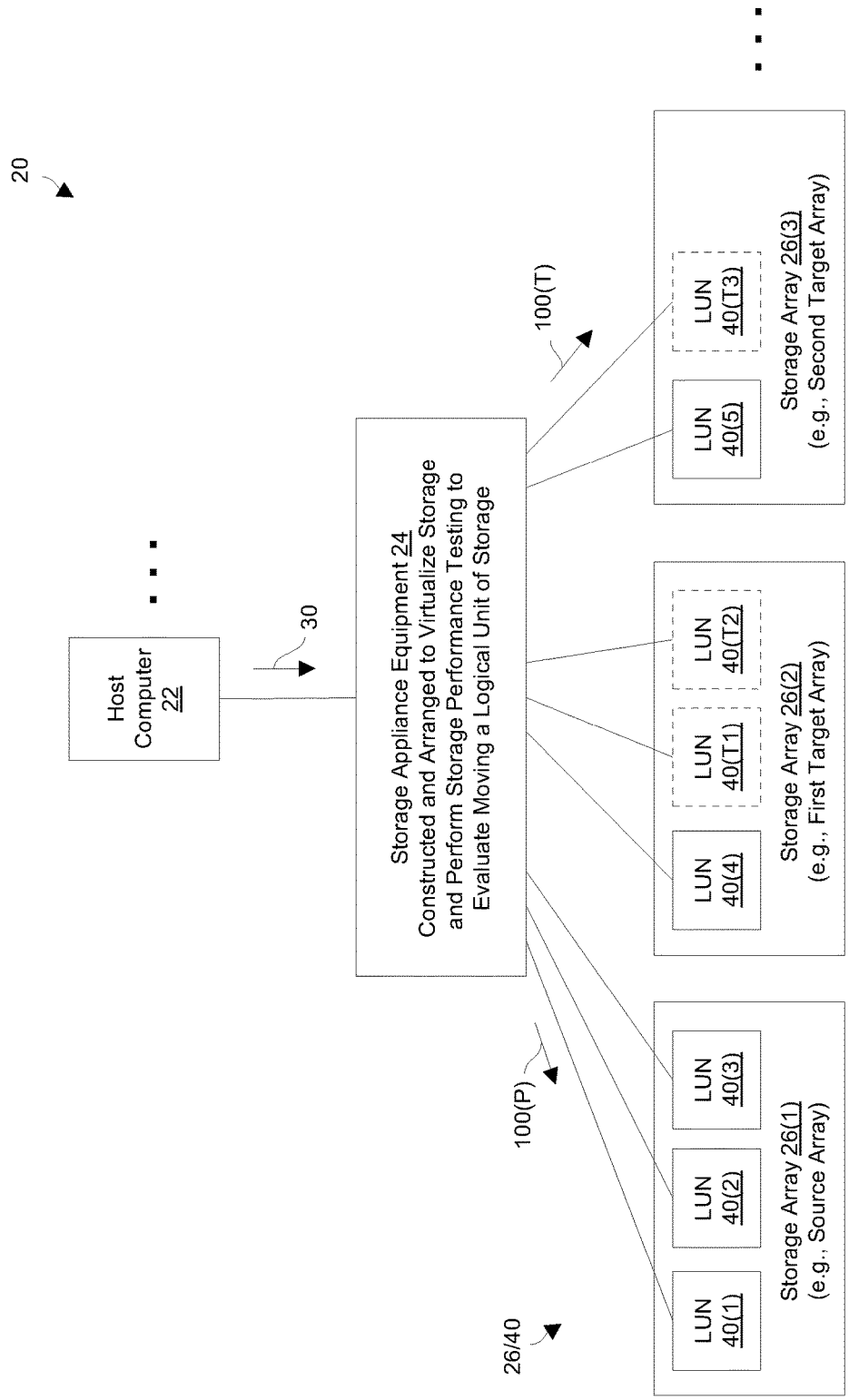
FIG. 7 is a block diagram illustrating particular details of the data storage environment during storage performance testing of LUN combinations.

A few use-case examples will now be provided. Such examples will be provided with reference to FIGS. 6-10.
Simultaneous Storage Performance Testing FIGS. 6 and 7 show data storage arrays 26(1), 26(2), 26(3), . . . which are in communication with the storage appliance equipment 24. One or more host computers 22 are able to access production LUNs 40 on these data storage arrays 26 via the storage appliance equipment 24. FIG. 6 shows details of evaluating multiple host accessible arrays 26 at the same time. FIG. 7 shows details of evaluating possible movement of multiple LUNs 40 to a single host accessible array 26.

FIG. 6 illustrates how multiple data storage arrays 26 can be tested simultaneously to ascertain a new location for a LUN 40. Testing multiple candidate target arrays 26 expedites identification of an appropriate target array 26 and avoids drawbacks of testing target arrays 26 serially (e.g., unnecessary delays, coordination to purposefully coincide with or avoid peak-performance periods, etc.). In particular, as an extension to the earlier-provided example (also see FIGS. 3 and 4), the storage appliance equipment 24 concurrently tests arrays 26(2) and 26(3) to determine whether either is suitable for supporting a production LUN 40(2). Such multi-testing of the arrays 26 is again transparent to all host computers 22.

As shown in FIG. 6, the storage appliance equipment 24 creates a test LUN 40(T1) on the array 26(2) and another test LUN 40(T2) on the array 26(3) while processing actual host I/O requests 30 (e.g., sending backend host I/O requests 100(P) to the production LUN 40(2) on the array 26(1)). Selection of the candidate target arrays 26 may be performed automatically by the storage appliance equipment 24 based on a set of selection criteria (e.g., size requirements, known bandwidth, tier availability, etc.). Alternatively, such selection may be performed manually by the user. It should be understood that even though only two candidate target arrays 26 have been selected for simultaneous testing by way of example, more than two candidate target arrays 26 can be tested at the same time (e.g., three, four, and so on).

Once the storage appliance equipment 24 has created the test LUNs 40(T1), 40(T2), the storage appliance equipment 24 concurrently sends simulated host I/O requests 100(T1) to the test LUN 40(T1) and simulated host I/O requests 100(T2) to the test LUN 40(T2). During such simulation the storage appliance equipment 24 performs performance evaluation operations on each array 26 under test. In particular, the storage appliance equipment 24 assesses a performance outcome of moving the production LUN 40(2) from the array 26(1) to each target storage location to each array 26 under test.

Next, the storage appliance equipment 24 chooses a suitable candidate array 26 based on a set of electronic performance assessments resulting from the performance evaluation operations performed on each array 26 under test, and moves the production LUN 40(2) from the array 26(1) to the selected array 26. Along these lines, the set of electronic performance assessments may indicate that the array 26(2) is unsuitable (e.g., due to poor latency or non-compliance with an SLA) but that the array 26(3) is suitable, and therefore the storage appliance equipment 24 moves the production LUN 40(2) to the array 26(3) (also see FIG. 4). If there are multiple suitable arrays 26, the storage appliance equipment 24 may pick a particular suitable array 26 based on secondary criteria (e.g., round robin selection, based on bandwidth, according to a predefined array ranking, based on extra capacity, etc.).

Based on the above, one should appreciate that it could be especially problematic if testing were otherwise performed only at specific times, such as peak-performance periods (such as peak-business hours or reporting periods such as end-of-day, end-of-week, end-of-month, end-of-quarter or end-of-year). Since peak-performance periods do not occur all the time, the above-described simultaneous testing can be a significant time-saver.

FIG. 7 shows testing of LUN combinations. That is, suppose there are three LUNs 40(1), 40(2), 40(3) that need to be moved, e.g., perhaps due to a plan to decommission the array 26(1). Further suppose that a candidate target array 26(2) already supports an existing LUN 40(4), and that a candidate target array 26(3) already supports an existing LUN 40(5). In such a situation, the storage appliance equipment 24 is able simultaneously test various LUN combinations on the candidate target arrays 26.

For example, as shown in FIG. 7, the storage appliance equipment 24 creates LUNs 40(T1), 40(T2) on the array 26(2) to test suitability of moving the production LUNs 40(1), 40(2) to the array 26(2) while the storage appliance equipment 24 continues to process actual host I/O requests 100(P) on the production LUNs 40(1), 40(2) of the array 26(1). Also, the storage appliance equipment 24 creates LUN 40(T3) on the array 26(3) to test suitability of moving the production LUN 40(3) to the array 26(3) while the storage appliance equipment 24 continues to process actual host I/O requests 100(P) on the production LUN 40(3) of the array 26(1).

Ultimately, the results of the performance evaluation operations (i.e., processing backend host I/O requests 100 (T) which simulate actual host I/O requests and measuring the resulting performance) must indicate that such movement will satisfy the needs of the production LUNs 40 to be moved as well as the existing production LUNs on the target arrays 26. If so a positive determination is made, the storage appliance equipment 24 may move the production LUNs 40 to these designated target arrays 26. In particular, the storage appliance equipment 24 verifies that each target array 26 is suitable for the actual production LUN 40 in their eventual locations (e.g., SLA compliance, correct size requirements, etc.).

Alternatively, the storage appliance equipment 24 may perform other simulations to determine whether other combinations will work. For example, the storage appliance equipment 24 may subsequently place test LUN 40(T1) on the array 26(2) and test LUNs 40(T2), 40(T3) on the array 26(3) and perform further evaluation. As another example, the storage appliance equipment 24 may place test LUNs 40(T1), 40(T3) on the array 26(2) and test LUN 40(T2) on the array 26(3), and so on.

There are of course many other variations that are possible and anticipated such as evaluating placement of production LUNs 40 from more than one source array 26 onto a single candidate target array 26. Along these lines, it is possible for one array 26 (e.g., the array 26(2) in FIG. 7) to hold multiple test LUNs 40 from different source arrays 26 and for another array 26 (e.g., the array 26(3) in FIG. 7) to hold multiple test LUNs 40 from different source arrays 26 as well. In such a situation, the arrays 26 may simultaneously test multiple LUNs 40 (or workloads) at the same time.

Another situation is when a source storage array 26 is overloaded. Suppose that the source storage array 26 has 10 workloads, numbered W1 through W10. In this situation, suppose that one of the workloads W1, W2 must be moved and that the workloads W1, W2 are roughly comparable. Here, suppose that the candidate target arrays 26(2), 26(3) are available (also see FIG. 7).

The storage appliance equipment 24 may simultaneously run the workload W1 on the array 26(2), and the workload W2 on the array 26(3). The storage appliance equipment 24 could end the simulation at this point and choose the better match, i.e., (i) the workload W1 on the array 26(2) and the workload W2 on the array 26(3), or (ii) the workload W2 on the array 26(2) and the workload W1 on the array 26(3).

Alternatively, after the storage appliance equipment 24 has performed the above-described simulation for a while, the storage appliance equipment 24 may try another possibility such as running the workload W1 on the array 26(3), and the workload W2 on the array 26(2). After such additional simulation, the storage appliance equipment 24 can choose the best move (e.g., the optimal locations), and so on.

One will appreciate that there are many criteria that can be used to decide where to move LUNs and/or workloads. Simple criteria can include a relative cost of using each of the candidate target arrays 26. A straight-forward cost computation can then be used to decide. Other criteria can include "best-fit". For example, assume that it is determined that loading a storage system at 70% of its peak capability is optimal (in order to allow headroom for growth, for workload spikes, and so forth). It could be further assumed that most workloads are between 10% and 15% of a typical storage system. Thus, if a storage system becomes loaded at 60%-65%, it becomes very hard to use the last 5% without going over the preferred 70% peak workload, which is a waste of expensive storage system resources. In such situations, the target system can be selected that will result in in loads that are either below 60% or between 65% and 70%. Another way of viewing such testing is that such testing is a type of "bin-packing problem" in which the LUNs and/or workloads are being evaluated for optimized relocation.

Furthermore, by testing more combinations, the operator (e.g., a data center) will enjoy improved efficiency. For example, consider a workload that is to be moved to a different storage system. If candidate target storage systems are tested one-at-a-time (say T1), the workload may be placed on a first target storage system due to a conclusion that performance is "good enough". However, by testing two or more target storage systems (T1 and T2) at the same time, the operator can choose the better of the two, which may be a different target storage system (e.g. T2 rather than T1) resulting in better overall data center efficiency.

Recording I/O Traces for Non-Peak Testing and Testing on a Simulator

Figure 8:
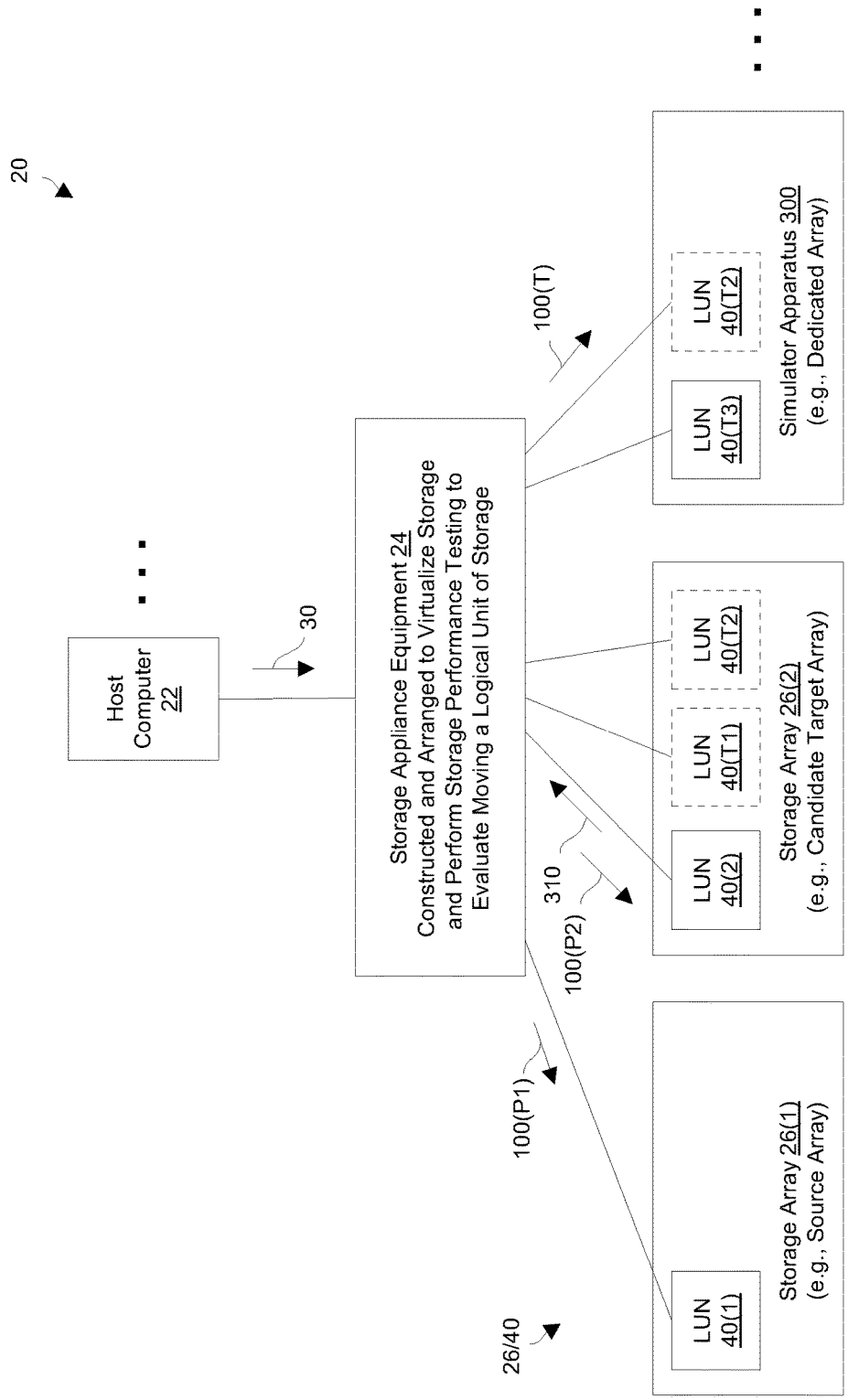
FIG. 8 is a block diagram illustrating particular details of the data storage environment during storage performance testing during non-peak operation and on a simulator.

FIG. 8 shows how possible movement of a LUN 40 to a candidate target array 26 can be evaluated even though such evaluation using a test LUN 40 does not take place during times of actual peak operation. FIG. 8 further shows how such evaluation can be performed using a simulator apparatus 300.

As shown in FIG. 8, the storage appliance equipment 24 operates as a front end to multiple data storage arrays 26 by processing I/O requests 30 from one or more host computers 22. In particular, in response to the I/O requests 30, the storage appliance equipment 24 may send certain backend I/O requests 100(P1) to a first production LUN 40(1) on the array 26(1), and other backend I/O requests 100(P2) to a second production LUN 40(2) on the array 26(2). Accordingly, the one or more host computers 22 are able to access host data on the production LUNs 40(1), 40(2).

Now, suppose that a user (e.g., a human administrator of a data center) wishes to determine whether the array 26(2) is suitable for supporting both of the production LUNs 40(1), 40(2) at the same time. To this end, the user directs the storage appliance equipment 24 to obtain a set of I/O traces 310 (i.e., I/O trace data) from the array 26(2) to identify particular operating characteristics such as times of peak operation, levels of I/O traffic during peak operation, types of host I/O operations during peak operation (e.g., read, write, read-modify-write, etc.), data sizes of the host I/O operations, and so on. Such monitoring may take place transparently to the host computers 22.

With the set of I/O traces 310 now available, the storage appliance equipment 24 is able to simulate a peak-load situation on the array 26(2). To this end, the storage appliance equipment 24 creates a test LUN 40(T1) on the array 26(2) and throttles a series of host I/O requests 100(T) to the test LUN 40(T1) based on the set of I/O traces 310 to simulate the array 26(2) operating under peak loading. Additionally, the storage appliance equipment 24 creates a second test LUN 40(T2) on the array 26(2) and sends other host I/O requests 100(T) to the test LUN 40(T2) to simulate operation of the production LUN 40(1) on the array 26(2), i.e., if the production LUN 40(1) were moved to the array 26(2). As a result, the storage appliance equipment 24 is able to assess how the production LUN 40(1) would perform during peak loading of the array 26(2) without having to perform testing during actual peak loading of the array 26(2). In some arrangements, the storage appliance equipment 24 creates only one test LUN 40 on the candidate target array 26(2).

It should be understood that gathering the set of I/O traces 310 can be performed routinely and as a low priority background service rather than in response to a user command. Accordingly, performance assessment can take place without needing to wait for the next time the array 26(2) undergoes actual peak loading thus saving time and not interfering with the array 26(2) during actual peak loading.

Alternatively, with the set of I/O traces 310 now available, the storage appliance equipment 24 can simulate operation of the actual array 26(2) on the simulator apparatus 300. Here, the simulator apparatus 30 is configured to operate in a manner similar to the actual array 26(2). Such configuration can be achieved via allocating resources and/or setting control parameters, which are similar to those of the actual array 26(2), on the simulator apparatus (or dedicated array) 300. Characteristics such as clock speed, memory allocation, bus speeds, I/O traffic, and so on can be simulated by the simulator apparatus 300.

Next, the storage appliance equipment 24 creates a test LUN 40(T3) on the simulator apparatus 300 and sends host I/O requests 100(T) to the test LUN 40(T3) to simulate the actual array 26(2) with the actual production LUN 40(2) operating at peak loading. Additionally, the storage appliance equipment 24 creates the test LUN 40(T2) on the simulator apparatus 300 and sends other host I/O requests 100(T) to the test LUN 40(T2) on the simulator apparatus 300 to mimic operation of the production LUN 40(1) on the simulator apparatus 300. Thus, the storage appliance equipment 24 is able to accurately assess how the production LUN 40(1) would perform during peak loading of the array 26(2) without having to perform testing on the actual candidate target storage array 26(2).

One should appreciate that in order to effectively test a workload on a candidate target storage array 26, it is important to test the performance at peak workload times. These peak workload times are usually the most challenging times for the array 26 to meet the performance goals for the production LUNs 40 that are on it. In other words, it is often the most important criteria when transferring a production LUN 40 from a source array 26 to a target array 26, that the performance on the target array 26 be acceptable with the transferred LUNs 40 during peak workload times. In many cases, the peak workload times are also the times that have the most business importance for the user.

Examples of peak workload times include morning hours (such as at the beginning of stock market trading), end-of-period reporting, end of day, end of week, end of month, end of quarter or end of year, and so on. In many cases, there are significant business and regulatory reasons for making sure that processing of data is accomplished on time. For example, there may be significant regulatory penalties for delayed reports. Since the occurrence of peak workload times may be relatively rare (for example once per day, week, month, quarter or year), or may be unpredictable, the above-described improved techniques alleviate the need to wait for such occurrences.

If the user had to wait, the user would not benefit from using the target storage array as the data has not been migrated to that storage array. The data would only be transferable to the target array following the next workload period.

Moreover, if the user had to wait and if the "experiment" during the next peak workload period were to "fail", then the user would need to wait for the next "experiment" opportunity during the subsequent peak workload, which may be a long time in the future. In fact, if there are a sequence of experiment failures, then it could take an arbitrarily long before the right target array 26 is found to accept the production LUN 40.

Furthermore, in some cases, the need for a certain performance level exists only at the peak workload times. For example, if the production LUN 40 contains a database, the source array 26 may have acceptable levels of performance for that database during all times except the reporting period when peak performance is required. In such cases, it could be prudent to migrate the LUN 40 for just the peak workload period. Clearly, the "experimental" approach does not work well when a specified performance level is required during relatively rare peak workload periods.

However, in connection with FIG. 8, the storage appliance equipment 24 obtains, as the set of I/O traces 310, a record of all I/O requests during a peak period and then simulates alternative configurations during non-peak periods. These simulations can mimic all of the actual I/O requests 100(P2) that are already sent to the candidate target array 26(2), together with all the actual I/O requests 100(P1) for the production LUN 40(1) (or LUNs 40) that are candidates for being moved to the candidate target array 26(2). Such simulations can either be run on the candidate target array 26(2) during non-peak periods, or alternatively they can be run on the simulator apparatus 300 which simulates the candidate target array 26(2). Though there are many different types of simulators, amongst the simplest to construct are machines that run the software of the candidate target array 26(2) but without actual storage LUNs 40, cache or other resources. Instead, the performance behavior of the LUNs 40, cache and other resources are simulated as well.

One should appreciate that the set of I/O traces 310 may include a record of all I/O operations performed by the candidate target array 26(2) during the peak workload period. For each I/O operation that occurs during the peak workload period, the storage appliance equipment 24 may record just a few basic bits of information, but need not record the host data itself. The information that would be retained includes which production LUN 40 the I/O operation occurred on, whether that I/O operation was a read or write, the time that the I/O operation occurred (e.g., relative to the start of record keeping), the starting address on the production LUN 40 of that I/O operation, and the size of the host data, among other things. The complete set of I/O operations for a LUN 40 (or multiple LUNs 40) on the candidate target array 26(2) during some period of time is called a "trace".

It should be understood that many users know when the peak workload periods for candidate target arrays 26 occur. During each such peak workload period, the storage appliance equipment 24 stores traces 310 for all storage arrays 26 that are potential candidate source or target arrays 26. For example, if a storage array 26 is reaching 80% of capacity, and projections show that it may become saturated within the not too distant future (say in a month or two), then the storage appliance equipment 24 would retain a "trace" of all of the I/O operations that occur on that storage array 26, as well as for other storage arrays 26 that are candidates for receiving new workloads.

Similarly, during quarterly or annual peak workload periods, the storage appliance equipment 24 records all of the I/O operations that occur during that peak workload period into a trace 310. Then, the storage appliance equipment 24 is able to "try" the peak workloads on the candidate target array 26 during other non-peak workload times, or alternatively "try" the peak workloads on the simulator apparatus 300. It should be clear that "simulations" can occur at a speed that is faster than real-time as it is not necessary to "wait for actual" storage devices to perform I/O operations.

In some arrangements, it is not necessary to store each I/O operation. Rather, all that is needed are summaries of the I/O operations for each time period. A typical time period may be a tenth of a second. For each time period (e.g. one tenth of a second), the storage appliance equipment 24 stores, for each I/O operation, size, how many I/O operations occurred, how many were reads and how many were writes, how many of the reads were cache hits, how many were sequential I/Os, etc.

In some arrangements, the use of these traces 310 allows many different combinations of target arrays 26 and LUNs 40 to be tried. For example, if there are five LUNs 40 to be moved and two potential target arrays 26, then a few different combinations can be tried to find the right target arrays 26 for each of those five LUNs 40. In order to avoid combinatorial blow-up, the storage appliance equipment 24 is able to use simulated annealing or another combinatorial-reducer algorithm to find a "more than good enough even if not provable optimal" within the solution space.

As described above, storing traces 310 of the arrays 26 during peak workload periods can be used as the basis for determining whether a candidate target array 26 would be able to handle the additional load presented by a production LUN 40 that is on a production array 26. As running these simulations does not have to occur during an actual peak workload period, it is possible to run the simulation in advance of the next peak workload period and determine in advance that moving the production LUN 40 to the target storage array 26 will result in acceptable performance for both the already existing workload (on the target storage array 26) as well as the migrated LUN 40. The result is the ability to serve more LUNs 40 with existing equipment while providing the performance level that is required.

Smart Configuration Based on Metadata

Figure 9:
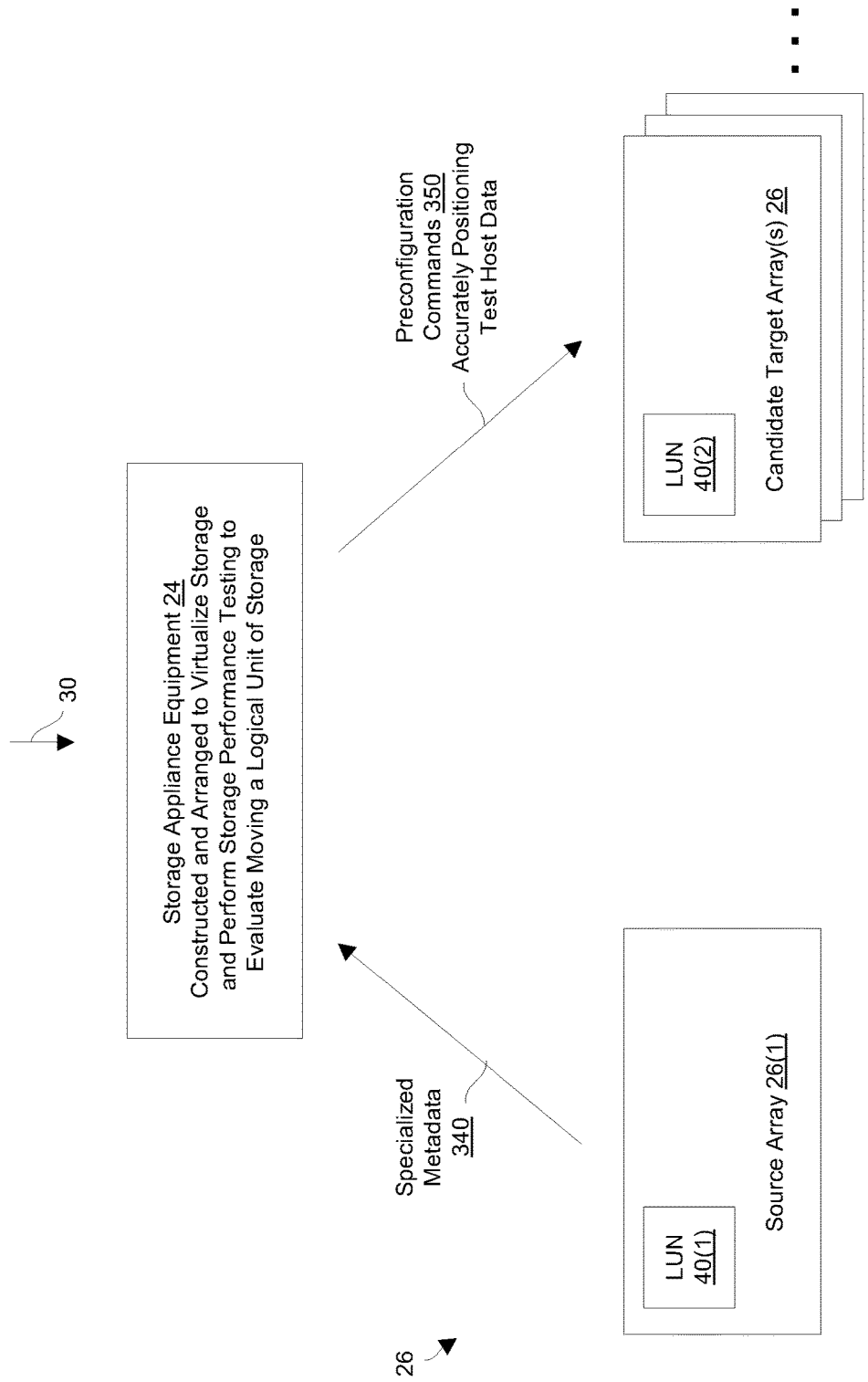
FIG. 9 is a block diagram of particular details of a data storage array which is warmed up based on metadata for more accurate evaluation.

FIG. 9 shows how the storage appliance equipment 24 obtains specialized metadata 340 from a source array 26(1) and uses that specialized metadata 340 to preconfigure a set of candidate target arrays 26 for performance evaluation. In particular, the storage appliance equipment 24 gathers the metadata 340 from the source array 26(1) by monitoring operation of the source array 26(1) over time. The metadata 340 indicates particular operating parameters for one or more LUNs and/or workloads that may be moved from the source array 26 to another array 26. Such metadata 340 indicates where the relevant data resides (e.g., exclusively on a tier of flash memory, distributed among a first tier of flash memory and slower disk drive memory, predominantly in a read cache, in a write cache, etc.), as well as other environmental aspects for the actual production LUNs and/or workloads (e.g., platform details, operating system versions, tunable settings, and so on).

For example, for a period of peak operation of the source array 26(1), the metadata may indicate that 75% of the host I/O requests to a production LUN 40(1) are read commands that are satisfied by reading host data from a read cache (cache hits), 10% of the host I/O requests to the LUN 40(1) are read requests that are satisfied by reading host data from a tier of flash memory (cache misses), 2% of the host I/O requests to the LUN 40(1) are read requests that are satisfied by reading host data from a tier of moderate speed magnetic disk drives (cache misses), and the remaining host I/O requests are writes to a write cache which is completely full and thus requires constant flushing to secondary storage. Such metadata may also indicate special pre-fetch policies that are in place, the capacities of the read and write caches, types/speeds of the storage devices that form the various storage tiers, the protocols used to reach such storage devices (e.g., SAS, PCIe, etc.), and so on.

With the specialized metadata 340 available, the storage appliance equipment 24 is able to send pre-configuration commands 350 to each candidate target array 26 to "warm up" simulated host data on a test LUN 40(2) on that candidate target array 26. That is, in response to the pre-configuration commands 350, each candidate target array 26 performs preliminary operations to move test host data to appropriate locations among the tiers, caches, etc. to more accurately simulate the expected behavior if the actual production LUN 40(1) were moved from the source array 26(1) to each candidate target array 26. For example, the pre-configuration commands 350 may move an appropriate percentage of test host data in each of the read and write caches, and among different storage tiers of secondary memory.

Once a candidate target array 26 is appropriately warmed up as described above, the storage appliance equipment 24 provides simulated host I/O requests to that candidate target array 26 and measures the resulting performance. Since the test host data has been appropriately placed based on the specialized metadata, the performance assessments made by the storage appliance equipment 24 while exercising the candidate target arrays 26 will be more accurate.

In addition to making simulation on the candidate target arrays 26 more accurate, the specialized metadata 340 saves time in how long each simulation has to run in order for that simulation to be reliable. As mentioned above, the metadata 340 is additional information about one or more LUNs and/or workloads that can impact the performance of the simulation of the LUNs and/or workloads on the candidate target arrays 26. Further examples of metadata 340 include detailed information from the source array 26(1) about cache usage, additional tiering information (e.g., particular extents of a workload that are used more heavily and reside in faster tiers of storage such as flash, and which reside in other slower tiers of storage), other services that are being performed such as virtualization of various sorts, synchronous/asynchronous/other copies to multiple targets (e.g., for replication, data recovery, archiving, etc.), scheduled snapshots, ongoing local or remote cloning, ongoing backups, deduplication services, and so on. Other metadata examples include workload characteristics such as IO patterns at various times of day, workload characteristics such as workload category (e.g., a standard database workload, a reporting workload, etc.), average IO size (or a description of the distribution of IO sizes), read write ratio, IOPS/MBps, various skew information, and so on.

With this metadata 340, each candidate target array 26 can potentially provide a more accurate simulation of how it would process the workload over the long term. Similarly, by having this metadata information, the length of time needed to perform the simulation can be shortened, because each candidate target array 26 does not need to first spend time "learning or adapting" to the workload.

Providing this metadata 340 can also reduce the sensitivity for exactly when the simulation is performed. Along these lines, the candidate target array 26 can now be tested during peak periods or during non-peak periods (e.g., with simulated peak period operation). Without the metadata 340, simulation would need to start much earlier to make sure that the cache, tiering and other technologies on the target system are "warmed up" prior to the peak workload period.

Migration to Accommodate Reduced Performance Requirements

Figure 10:
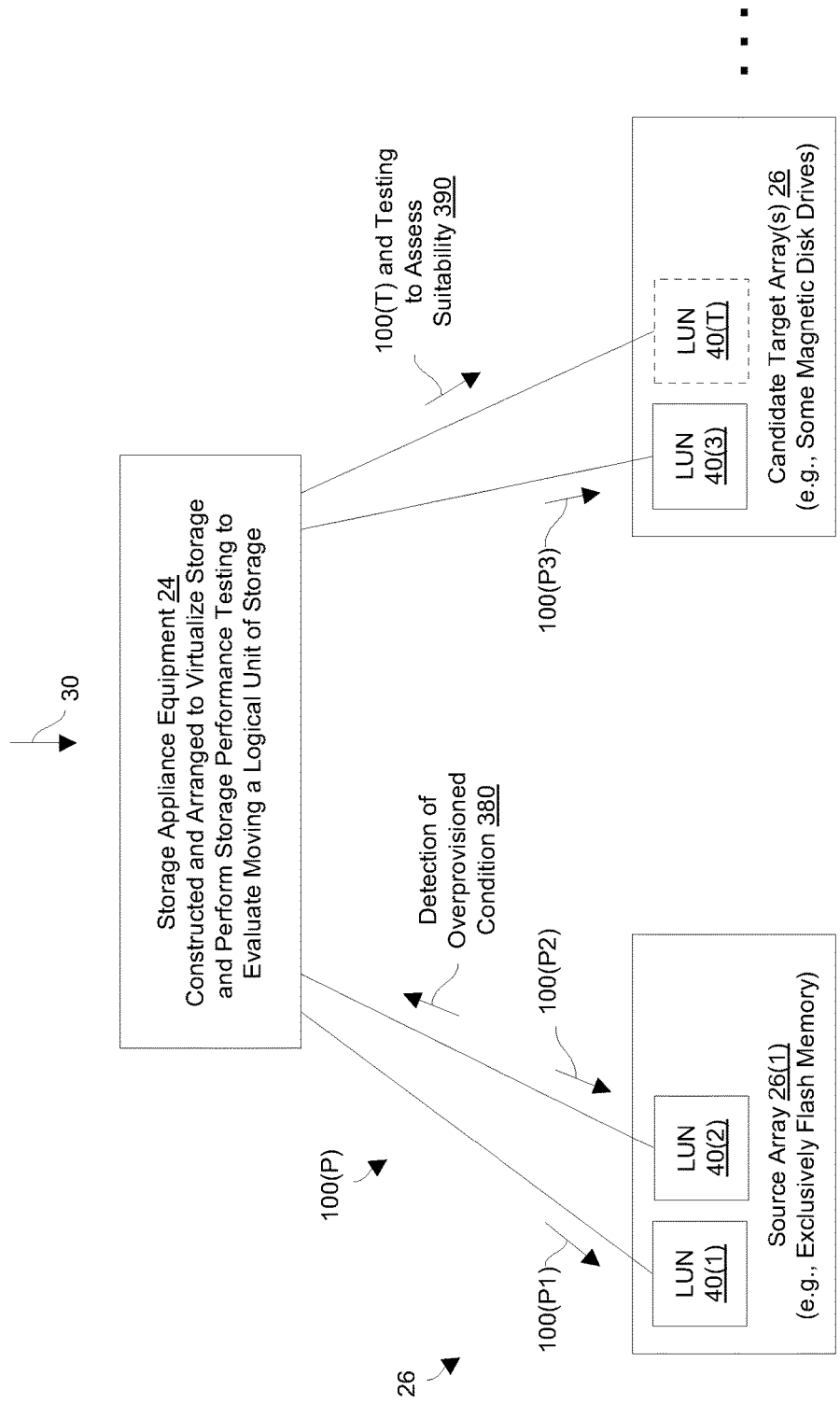
FIG. 10 is a block diagram illustrating particular details of the data storage environment to accommodate reduced performance requirements.

FIG. 10 shows how the storage appliance equipment 24 accommodates reduced performance requirements. As shown, the data storage array 26(1) processes actual host I/O requests 100(P1), 100(P2) on production LUNs 40(1), 40(2), respectively. Similarly, the data storage array 26(2) processes host I/O requests 100(P3) on production LUN 40(3). As mentioned earlier, these actual host I/O requests 100(P) are provided by the storage appliance equipment 24 in response to host I/O requests 30 from one or more host computers 22 (e.g., also see FIG. 3).

Now, suppose that the data storage array 26(1) is a high-end data storage array that includes only flash memory thus providing extremely fast performance. Additionally, suppose that the data storage array 26(2) is a medium-performance data storage array that includes a flash memory tier, a tier of high-speed magnetic disk drives, and a tier of slower legacy magnetic disk drives.

In this situation, suppose that the user monitors the performance of the production LUN 40(2) on the array 26(1) and sees that the response time is 2-3 milliseconds while the required response time for the production LUN 40(2) is 4.5 milliseconds. Here, the user may view locating the production LUN 40(2) on the array 26(1) to be too expensive and thus consider finding a new location for the production LUN 40(2), i.e., an array 26 with lower performance which nevertheless satisfies the performance requirements for the production LUN 40(2).

It should be understood that, to facilitate the user's detection of this over-performance condition 380, the user may have monitored the operation of the array 26(1) using the storage appliance equipment 24. For example, the user may have measured the response times for attending to the host I/O requests 100(P2) and determined that the response times were well below those specified by an SLA for the production LUN 40(2).

Upon detection of the over-provisioned condition 380 for the production LUN 40(2), the user may direct the storage appliance equipment 24 to evaluate the prospect of moving the production LUN 40(2) from the array 26(1) to the array 26(2), i.e., a target storage location which provides slower access to host data but nevertheless satisfies the requirements for the production LUN 40(2). To this end, the storage appliance equipment 24 creates a test LUN 40(T) on the array 26(2) (and perhaps on other candidate target arrays 26). The storage appliance equipment 24 then provides simulated host I/O requests 100(T) to the array 26(2) for processing on the test LUN 40(T). In this manner, the storage appliance equipment 24 is able to perform testing to assess suitability of the array 26(2) as a new location for the production LUN 40(2).

If the results of the performance evaluation of the array 26(2) indicate that the response time is 4 milliseconds which complies with the required 4.5 millisecond response time, the storage appliance equipment 24 may effectuate a move of the production LUN 40(2) from the array 26(1) to the array 26(2). In some arrangements, the storage appliance equipment 24 may further specify particular tier locations for the production LUN 40(2) (e.g., the tier of high-speed magnetic disk drives of the array 26(2), etc.).

However, if the results of the performance evaluation of the array 26(2) indicate that that the response time is 5 milliseconds which does not comply with the required 4.5 millisecond response time, the storage appliance equipment 24 indicates to the user that such a move would not satisfy the requirements for the production LUN 40(2). At this point, the user may select another array 26 (e.g., perhaps another array 26 that was tested concurrently and that indicates suitability, another array 26 for testing, and so on).

It should be understood that moving the production LUN 40(2) from the array 26(1) to the array 26(2) enables the storage appliance equipment 24 to address a situation in which the current array 26 is over performing and the requirements of the workload are significantly less than the current array 26(1) offers. One should appreciate that such movement may be particularly well suited for a situation in which the current array 26(1) (e.g., a flash array) may not be able to "slow down" to a lower class of service or where it would be inefficient or undesirable to slow down the current array 26(1) to the lower class of service.

Along these lines, consider if the current array 26(1) is an all flash array and the workload initially requires a "platinum" class of service (which might be defined as sub-millisecond response times). Later, the workloads requirements change to a lower class of service such as a 5 millisecond average response time. The flash array may not be able to reduce performance to this lower class of service. Thus, though the application running the workload will not "complain" that it is getting that promised performance; in actuality it is a waste of the capabilities of the flash-based array.

To address this situation, the storage appliance equipment 24 moves the workload from the array 26(1) to the new array 26(2) that provides just the needed performance. Of course, prior to such a move, the storage appliance equipment 24 similarly confirms that the move does not negatively impact already existing workloads on the array 26(2).

It should be further understood that there are many possible specific criteria that can be used to determine that the performance on the new array 26 is adequate. Such criteria may include all the existing workloads continuing to offer their promised service level agreements (SLA) and the workload being tested getting a minimum of the class of service agreement that it requires and not better than some level (e.g., 40% better). For example, if the target service level agreement is 5 milliseconds average performance, then the requirements may dictate that the workload get at least 5 milliseconds average performance but not better than 3 milliseconds average performance.

FURTHER DETAILS

Figure 11:
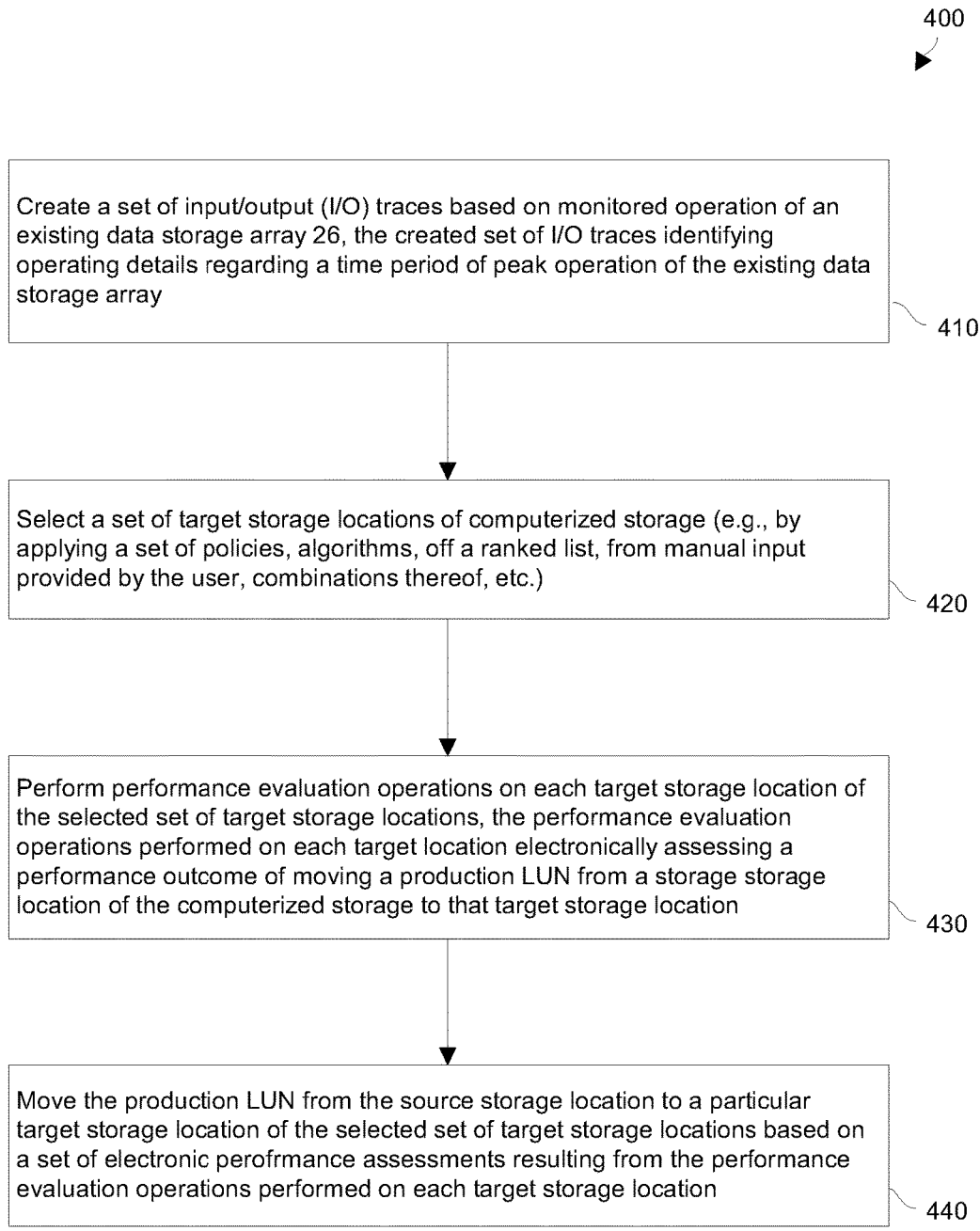
FIG. 11 is a flowchart of a procedure which is performed by the data storage environment shown in the other figures.

FIG. 11 is a flowchart of a procedure 400 which is performed by the storage appliance equipment 24 when controlling movement of a LUN 40 from one array 26 to another array 26. The procedure 400 includes details of particular activities performed by the storage appliance equipment 24 in at least some of the above-described use-cases which can be combined, modified, hybridized, and so on.

At 410, the storage appliance equipment 24 creates a set of I/O traces based on monitored operation of an existing data storage array 26 (also see FIG. 8). The created set of I/O traces identify operating details regarding a time period of peak operation of the existing data storage array. It should be understood that, in some arrangements, the storage appliance equipment 24 receives a set of I/O traces from each array 26 in communication with the storage appliance equipment 24.

At 420, the storage appliance equipment 24 selects a set of target storage locations of the computerized storage (e.g., see FIGS. 6 and 7). Here, the storage appliance equipment 24 may perform array selection algorithmically (e.g., by applying a set of policies, algorithms, etc.) to roughly identify suitable candidate target arrays 26 and omit arrays 26 which clearly are unsuitable. Alternatively, the storage appliance equipment 24 may select one or more candidate target arrays 26 via other means, e.g., off a ranked list, from manual input from a user, combinations thereof, etc. Selection of particular storage tiers on which to locate host data may be carried out in this same manner.

At 430, the storage appliance equipment 24 performs performance evaluation operations on each target storage location of the selected set of target storage locations. The performance evaluation operations performed on each target storage location electronically assess a performance outcome of moving a production LUN from a source storage location of the computerized storage to that target storage location. As mentioned above, in some arrangements, testing of multiple arrays 26 may be performed concurrently (FIG. 6). Also, combinations of LUNs may be tested (FIG. 7). Furthermore, testing may involve identification and simulation of peak operating times even though the array 26 under test is currently not under a peak load from the set of host computers 22, and so on (FIGS. 8 and 9).

At 440, the storage appliance equipment 24 moves the production LUN from the source storage location to a particular target storage location of the selected set of target storage locations based on a set of electronic performance assessments resulting from the performance evaluation operations performed on each target storage location. Here, the storage appliance equipment 24 removes the test LUNs, and migrates the production LUN(s) to the new locations. The reclaimed resources (e.g., storage capacity, workload capacity, bandwidth, etc.) can then be re-allocated to other work. Moreover, all of this activity may be made transparent to the host computers 22.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. A method of controlling movement of a logical unit of storage (LUN) among computerized storage, the method comprising:
   selecting, by processing circuitry, a set of target storage locations of the computerized storage;
   performing, by the processing circuitry, performance evaluation operations on each target storage location of the selected set of target storage locations, the performance evaluation operations performed on each target storage location electronically assessing a performance outcome of moving a production LUN from a source storage location of the computerized storage to that target storage location; and
   moving, by the processing circuitry, the production LUN from the source storage location to a particular target storage location of the selected set of target storage locations based on a set of electronic performance assessments resulting from the performance evaluation operations performed on each target storage location;
   wherein performing the performance evaluation operations includes:
   providing simulated host input/output (I/O) requests to at least one target storage location of the selected set of target storage locations while actual host I/O requests are processed on the production LUN at the source storage location on behalf of a set of host computers;
   wherein performing the performance evaluation operations further includes:
   in response to providing simulated host I/O requests to a test LUN at the particular target storage location, detecting that the particular target storage location provides slower data access speeds than that of the source storage location;
   wherein the source storage location resides on a first data storage array;
   wherein the particular target storage location resides on a second data storage array;
   wherein the second data storage array provides slower access to host data than that of the first data storage array; and
   wherein moving the production LUN from the source storage location to the particular target storage location includes, in response to detection that the particular target storage location (i) provides slower data access speeds than that of the source storage location and (ii) concurrently complies with a service level agreement that defines data access speed requirements for the production LUN, re-locating the production LUN from the first data storage array to the second data storage array that provides the slower access to host data.

2. A method as in claim 1 wherein providing the simulated host I/O requests includes: outputting, as the simulated I/O requests, read and write commands which mimic actual read and write commands sent from the set of host computers to the production LUN at the source storage location for processing.

3. A method as in claim 1 wherein the computerized storage includes multiple data storage arrays; and wherein providing the simulated host I/O requests includes: simultaneously sending the simulated host I/O requests to a respective test LUN on each of the multiple data storage arrays while actual host I/O requests are processed on the production LUN at the source storage location on behalf of the set of host computers.

4. A method as in claim 3 wherein simultaneously sending the simulated host I/O requests to the respective test LUN on each of the multiple data storage arrays includes:

outputting a first set of simulated host I/O requests to a first test LUN on a first host-accessible data storage array while the first host-accessible data storage array concurrently processes a first set of actual host I/O requests from the set of host computers, and outputting a second set of simulated host I/O requests to a second test LUN on a second host-accessible data storage array while the second host-accessible data storage array concurrently processes a second set of actual host I/O requests from the set of host computers.

5. A method as in claim 4 wherein the first host-accessible data storage array includes a faster storage tier of faster storage and a slower storage tier of slower storage that provides slower data access speeds than that of the faster storage tier of faster storage; and wherein outputting the first set of simulated host I/O requests to the first test LUN on the first host-accessible data storage array includes (i) processing some host I/O requests of the first set of simulated host I/O requests using the faster storage tier to determine whether placement of the production LUN on the faster storage tier complies with the service level agreement and (ii) processing other host I/O requests of the first set of simulated host I/O requests using the slower storage tier to determine whether placement of the production LUN on the slower storage tier complies with the service level agreement.

6. A method as in claim 4, further comprising:

outputting another set of simulated host I/O requests to the first host-accessible data storage array while the first host-accessible data storage array concurrently processes the first set of simulated host I/O requests and the first set of actual host I/O requests to assess a performance outcome of simultaneously re-locating (i) the production LUN from the source storage location of the computerized storage and (ii) another LUN from another source storage location to the first host-accessible data storage array.

7. A method as in claim 1 wherein the computerized storage includes an existing data storage array; and wherein the method further comprises: prior to providing the simulated host I/O requests, creating a set of I/O traces based on monitored operation of the existing data storage array, the created set of I/O traces identifying a time period of peak operation of the existing data storage array.

8. A method as in claim 7 wherein providing the simulated host I/O requests includes:

concurrently providing a first set of simulated host I/O requests and a second set of simulated host I/O requests to the existing data storage array, the first set of simulated host I/O requests duplicating a workload on the existing data storage array during the time period of peak operation of the existing data storage array, and the second set of simulated host I/O requests mimicking the actual host I/O requests that are processed on the production LUN at the source storage location on behalf of the set of host computers.

9. A method as in claim 7 wherein providing the simulated host I/O requests includes:

concurrently providing a first set of simulated host I/O requests and a second set of simulated host I/O requests to simulation circuitry which simulates behavior of the existing data storage array, wherein the first set of simulated host I/O requests duplicates, on the simulation circuitry, a workload on the existing data storage array during the time period of peak operation of the existing data storage array, and wherein the second set of simulated host I/O requests mimics, on the simulation circuitry, the actual host I/O requests that are processed on the production LUN at the source storage location on behalf of the set of host computers.

10. A method as in claim 1 wherein the method further comprises, prior to providing the simulated host I/O requests, generating specialized metadata based on monitored processing of the actual host I/O requests on the production LUN; wherein the specialized metadata identifies environmental characteristics of the source storage location residing on the first data storage array; and wherein performing the performance evaluation operations further includes, prior to providing the simulated host I/O requests and based on the specialized metadata, configuring the particular target storage location residing on the second data storage array with the same environmental characteristics as the source storage location residing on the first data storage array.

11. A method as in claim 10 wherein the second data storage array includes (i) multiple data storage tiers providing different data access speeds, (ii) a cache, and (iii) data storage services; and wherein configuring the particular target storage location residing on the second data storage array includes (i) distributing data of the test LUN among the multiple data storage tiers of the second data storage array based on the specialized metadata, (ii) copying at least some data of the test LUN into the cache of the second data storage array based on the specialized metadata, and (iii) invoking the data storage services in accordance with the specialized metadata to improve emulation of the production LUN using the test LUN.

12. A method of controlling movement of a logical unit of storage (LUN) among computerized storage, the method comprising:

selecting, by processing circuitry, a set of target storage locations of the computerized storage;

performing, by the processing circuitry, performance evaluation operations on each target storage location of the selected set of target storage locations, the performance evaluation operations performed on each target storage location electronically assessing a performance outcome of moving a production LUN from a source storage location of the computerized storage to that target storage location; and moving, by the processing circuitry, the production LUN from the source storage location to a particular target storage location of the selected set of target storage locations based on a set of electronic performance assessments resulting from the performance evaluation operations performed on each target storage location;

wherein performing the performance evaluation operations includes:

providing simulated host input/output (I/O) requests to at least one target storage location of the selected set of target storage locations while actual host I/O requests are processed on the production LUN at the source storage location on behalf of a set of host computers;

wherein performing the performance evaluation operations further includes:

in response to providing simulated host I/O requests to a test LUN at the particular target storage location, detecting that the particular target storage location provides slower data access speeds than that of the source storage location;

wherein the source storage location resides on a first data storage tier of a data storage array;

wherein the particular target storage location resides on a second data storage tier of the data storage array;

wherein the second data storage tier provides slower access to host data than that of the first data storage tier; and wherein moving the production LUN from the source storage location to the particular target storage location includes, in response to detection that the particular target storage location (i) provides slower data access speeds than that of the source storage location and (ii) concurrently complies with a service level agreement that defines data access speed requirements for the production LUN, re-locating the production LUN from the first data storage tier to the second data storage tier that provides the slower access to host data.

13. Electronic apparatus, comprising:
 interface circuitry constructed and arranged to interface with computerized storage;
 memory; and
 control circuitry coupled to the interface circuitry and the memory, the memory storing instructions which, when carried out by the control circuitry, cause the control circuitry to:
  select a set of target storage locations of the computerized storage,
  perform performance evaluation operations on each target storage location of the selected set of target storage locations through the interface circuitry, the performance evaluation operations performed on each target storage location electronically assessing a performance outcome of moving a production logical unit of storage (LUN) from a source storage location of the computerized storage to that target storage location, and
  move the production LUN from the source storage location to a particular target storage location of the selected set of target storage locations through the interface circuitry based on a set of electronic performance assessments resulting from the performance evaluation operations performed on each target storage location;

wherein the control circuitry, when performing the performance evaluation operations, is constructed and arranged to:
 provide simulated host input/output (I/O) requests to at least one target storage location of the selected set of target storage locations while actual host I/O requests are processed on the production LUN at the source storage location on behalf of a set of host computers;

wherein the control circuitry, when performing the performance evaluation operations, is further constructed and arranged to:
 in response to providing simulated host I/O requests to a test LUN at the particular target storage location, detect that the particular target storage location provides slower data access speeds than that of the source storage location;

wherein the source storage location resides on a first data storage array;

wherein the particular target storage location resides on a second data storage array;

wherein the second data storage array provides slower access to host data than that of the first data storage array; and wherein the control circuitry, when moving the production LUN from the source storage location to the particular target storage location, is constructed and arranged to, in response to detection that the particular target storage location (i) provides slower data access speeds than that of the source storage location and (ii) concurrently complies with a service level agreement that defines data access speed requirements for the production LUN, re-locate the production LUN from the first data storage array to the second data storage array that provides the slower access to host data.

14. Electronic apparatus as in claim 13 wherein the computerized storage includes multiple data storage arrays; and wherein the control circuitry, when performing the performance evaluation operations, is constructed and arranged to:
 simultaneously send read and write commands to a respective test LUN on each of the multiple data storage arrays while actual read and write commands are processed on the production LUN at the source storage location on behalf of a set of host computers.

15. Electronic apparatus as in claim 14 wherein the computerized storage includes an existing data storage array; and wherein the control circuitry is further constructed and arranged to:
 prior to simultaneously sending read and write commands to the respective test LUN on each of the multiple data storage arrays, create a set of I/O traces based on monitored operation of the existing data storage array, the created set of I/O traces identifying a time period of peak operation of the existing data storage array.

16. A computer program product having a non-transitory computer readable medium which stores a set of instructions to control movement of a logical unit of storage (LUN) among computerized storage; the set of instructions, when carried out by computerized circuitry, causing the computerized circuitry to perform a method of:
 selecting a set of target storage locations of the computerized storage;
 performing performance evaluation operations on each target storage location of the selected set of target storage locations, the performance evaluation operations performed on each target storage location electronically assessing a performance outcome of moving a production LUN from a source storage location of the computerized storage to that target storage location; and
 moving the production LUN from the source storage location to a particular target storage location of the selected set of target storage locations based on a set of electronic performance assessments resulting from the performance evaluation operations performed on each target storage location;

wherein performing the performance evaluation operations includes:
 providing simulated host input/output (I/O) requests to at least one target storage location of the selected set of target storage locations while actual host I/O requests are processed on the production LUN at the source storage location on behalf of a set of host computers;

wherein performing the performance evaluation operations further includes:
 in response to providing simulated host I/O requests to a test LUN at the particular target storage location, detecting that the particular target storage location provides slower data access speeds than that of the source storage location;

wherein the source storage location resides on a first data storage tier of a data storage array;
wherein the particular target storage location resides on a second data storage tier of the data storage array;
wherein the second data storage tier provides slower access to host data than that of the first data storage tier; and
wherein moving the production LUN from the source storage location to the particular target storage location includes, in response to detection that the particular target storage location (i) provides slower data access speeds than that of the source storage location and (ii) concurrently complies with a service level agreement that defines data access speed requirements for the production LUN, re-locating the production LUN from the first data storage tier to the second data storage tier that provides the slower access to host data.

17. A method as in claim 1 wherein the first data storage tier includes only flash memory;
wherein the second data storage tier includes only magnetic disk drives; and
wherein re-locating the production LUN from the first data storage tier to the second data storage tier includes:
reading host data from the flash memory and writing that host data to the magnetic disk drives to migrate the production LUN from the first data storage tier to the second data storage tier in a manner which is transparent to the set of host computers.

18. A method as in claim 1 wherein the service level agreement defines a requirement that a data access speed to access the production LUN must be less than a predefined time threshold.

19. A computer program product as in claim 16 wherein the first data storage tier includes only flash memory;
wherein the second data storage tier includes only magnetic disk drives; and
wherein re-locating the production LUN from the first data storage tier to the second data storage tier includes:
reading host data from the flash memory and writing that host data to the magnetic disk drives to migrate the production LUN from the first data storage tier to the second data storage tier in a manner which is transparent to the set of host computers.

20. A computer program product as in claim 16 wherein the service level agreement defines a requirement that a data access speed to access the production LUN must be less than a predefined time threshold.

* * * * *